(12) United States Patent
Bennett et al.

(10) Patent No.: US 9,046,637 B1
(45) Date of Patent: Jun. 2, 2015

(54) TUBULAR LIGHTING SYSTEMS WITH INNER AND OUTER STRUCTURED SURFACES

(71) Applicant: 3M INNOVATIVE PROPERTIES COMPANY, St. Paul, MN (US)

(72) Inventors: Robert Bennett, Berkshire (GB); David Scott Thompson, West Lakeland, MN (US); Gilles Benoit, Minneapolis, MN (US); John Wheatley, Lake Elmo, MN (US); Karl J. L. Geisler, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/188,687

(22) Filed: Feb. 25, 2014

(51) Int. Cl.
*H01J 61/30* (2006.01)
*F21V 8/00* (2006.01)

(52) U.S. Cl.
CPC ..................... *G02B 6/0096* (2013.01)

(58) Field of Classification Search
CPC ............................... H01J 29/861; H01J 61/34
USPC .................................................. 313/634, 493
See application file for complete search history.

(56) References Cited

U.S. PATENT DOCUMENTS

| 3,136,913 A * | 6/1964 | Goodman ..................... 313/111 |
| 4,834,495 A | 5/1989 | Whitehead |
| 4,850,665 A | 7/1989 | Whitehead |
| 4,989,948 A | 2/1991 | Dreyer, Jr. |
| 5,035,486 A | 7/1991 | Inokuchi |
| 5,183,597 A | 2/1993 | Lu |
| 5,339,382 A | 8/1994 | Whitehead |
| 5,471,348 A | 11/1995 | Miller |
| 5,745,632 A | 4/1998 | Dreyer |
| 6,337,946 B1 | 1/2002 | McGaffigan |
| 6,540,381 B1 | 4/2003 | Douglass, II |
| 7,537,374 B2 | 5/2009 | Schardt |
| 7,547,476 B2 | 6/2009 | Jones |
| 7,695,180 B2 | 4/2010 | Schardt |

(Continued)

FOREIGN PATENT DOCUMENTS

| WO | WO 2008/144636 | 11/2008 |
| WO | WO 2008/144644 | 11/2008 |

(Continued)

OTHER PUBLICATIONS

3M Application Guideline: "3M Uniformity Tape" (May 2011), 11 pages.

(Continued)

*Primary Examiner* — Vip Patel

(57) ABSTRACT

Lighting systems include a light-transmissive tube and a light source assembly disposed to inject light into a cavity defined by the tube. The cavity extends along a longitudinal axis. At least a portion of the tube includes an inner structured surface facing the cavity, and an outer structured surface facing away from the cavity. The inner structured surface is configured to direct a first portion of the injected light towards the outer structured surface, and a second portion of the injected light back into the cavity. The inner structured surface includes elongated first features and the outer structured surface includes elongated second features. At least one of the elongated first features and the elongated second features are oriented obliquely relative to the longitudinal axis such that they form respective helixes along the tube.

24 Claims, 28 Drawing Sheets

(56) References Cited

U.S. PATENT DOCUMENTS

| | | | |
|---|---|---|---|
| 7,815,355 B2 | 10/2010 | Thompson | |
| 7,884,532 B2 * | 2/2011 | Lee et al. | 313/161 |
| 8,487,518 B2 | 7/2013 | Johnston | |
| 8,596,825 B2 | 12/2013 | Johnston | |
| 2005/0024754 A1 | 2/2005 | Epstein | |
| 2007/0047228 A1 | 3/2007 | Thompson | |
| 2007/0242473 A1 | 10/2007 | Lee | |
| 2008/0037127 A1 | 2/2008 | Weber | |
| 2009/0017256 A1 | 1/2009 | Hunt | |
| 2011/0310587 A1 | 12/2011 | Edmond | |
| 2012/0154450 A1 | 6/2012 | Aho | |
| 2012/0194054 A1 | 8/2012 | Johnston | |
| 2013/0215512 A1 | 8/2013 | Coggio | |
| 2013/0258709 A1 | 10/2013 | Thompson | |
| 2013/0343046 A1 | 12/2013 | Tsai | |
| 2014/0043846 A1 | 2/2014 | Yang | |
| 2014/0043847 A1 | 2/2014 | Yang | |
| 2014/0043850 A1 | 2/2014 | Thompson | |
| 2014/0043856 A1 | 2/2014 | Thompson | |

FOREIGN PATENT DOCUMENTS

| | | |
|---|---|---|
| WO | WO 2008/144650 | 11/2008 |
| WO | WO 2008/144656 | 11/2008 |
| WO | WO 2008/147753 | 12/2008 |
| WO | WO 2009/105450 | 8/2009 |
| WO | WO 2009/149010 | 12/2009 |
| WO | WO 2009/151842 | 12/2009 |
| WO | WO 2009/151869 | 12/2009 |
| WO | WO 2010/062485 | 6/2010 |
| WO | WO 2010/074862 | 7/2010 |
| WO | WO 2010/117569 | 10/2010 |
| WO | WO 2012/075352 | 6/2012 |
| WO | WO 2012/075384 | 6/2012 |
| WO | WO 2012/109099 | 8/2012 |
| WO | WO 2012/138554 | 10/2012 |
| WO | WO 2012/144268 | 10/2012 |

OTHER PUBLICATIONS

3M Optical Systems, Vikuiti™ Transmissive Right Angle Film II (TRAF II) brochure, 2010.

U.S. Appl. No. 61/720,118, "Rectangular Light Duct Extraction", filed Oct. 30, 2012.

U.S. Appl. No. 61/720,124, "Curved Light Duct Extraction", filed Oct. 30, 2012.

U.S. Appl. No. 61/826,577, "Method for the Design of Optimal Structures for Lighting", filed May 23, 2013.

U.S. Appl. No. 61/810,294, "Remote Illumination Light Duct", filed Apr. 10, 2013.

U.S. Appl. No. 61/886,162, "Remote Illumination Light Duct", filed Oct. 3, 2013.

U.S. Appl. No. 61/874,183, "Double-sided Optical Film with Lenslets and Clusters of Prisms", filed Sep. 5, 2013.

U.S. Appl. No. 13/850,276, "Dual-Sided Film with Compound Prisms", filed Mar. 25, 2013.

U.S. Appl. No. 13/850,277, "Dual-Sided Film with Split Light Spreading Structures", filed Mar. 25, 2013.

PCT patent application US2014/032644 "Solid State Lighting Device with Virtual Filament(s)", filed Apr. 2, 2014.

* cited by examiner

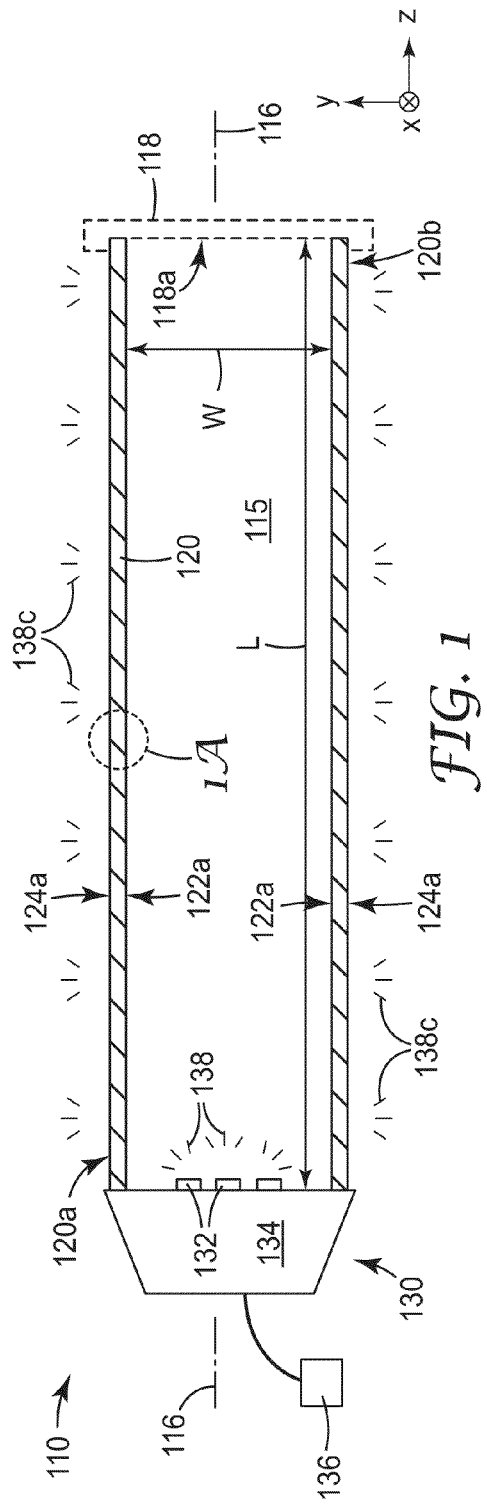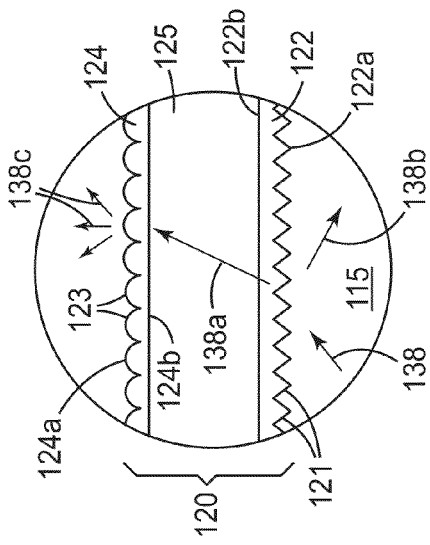
FIG. 1
FIG. 1A

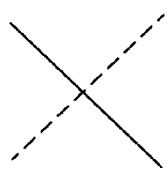 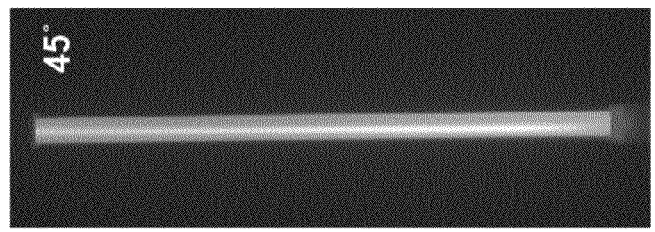
FIG. 24D
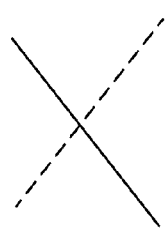 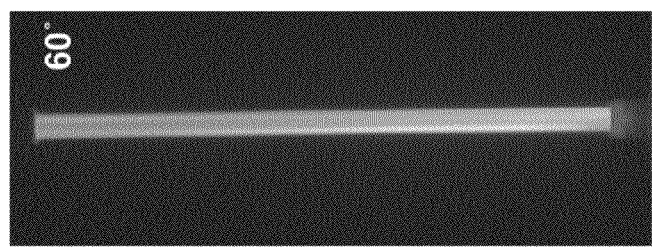
FIG. 24C
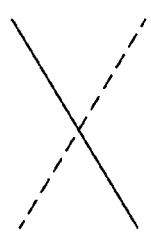 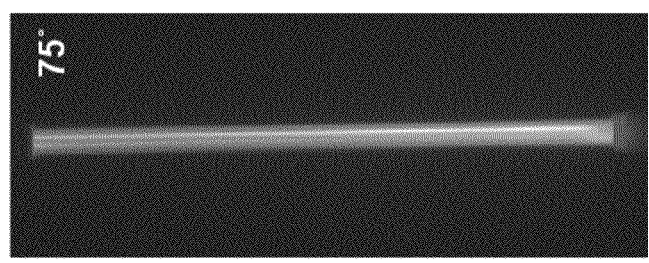
FIG. 24B
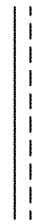 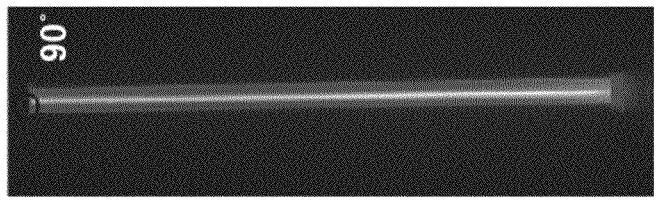
FIG. 24A

———————— 90°
- - - - - - -

45°

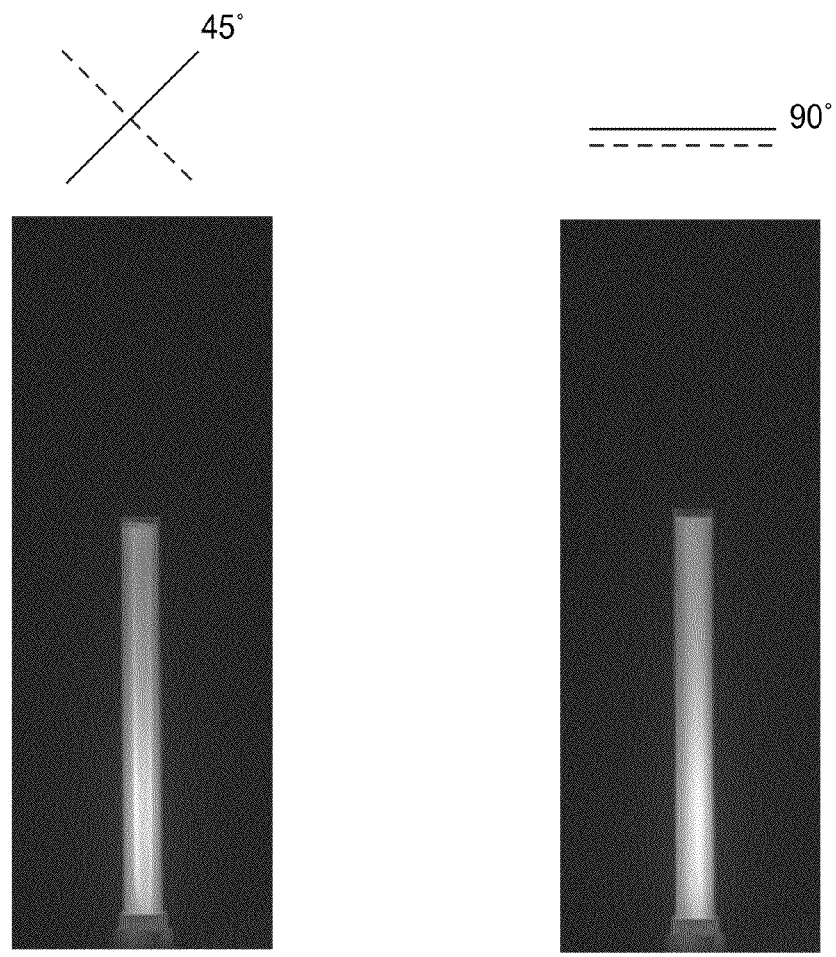
*FIG. 28A*    *FIG. 28B*

TUBULAR LIGHTING SYSTEMS WITH INNER AND OUTER STRUCTURED SURFACES

FIELD OF THE INVENTION

This invention relates generally to lighting systems, with particular application to lighting systems that utilize one or more LED or other solid state light sources. The invention also relates to associated articles, systems, and methods.

BACKGROUND

Recent years have seen a proliferation of new and different lighting devices and systems being introduced for commercial and residential lighting applications. For example, compact fluorescent (CFL) light bulbs of various shapes and sizes are now commercially available, and users are being encouraged to replace Edison-type incandescent bulbs with CFL bulbs to reduce energy demands. Light emitting diodes (LEDs) are also being used in a growing number of applications, from automobile lights to television backlights to general purpose light bulbs. LEDs generate light when electrons combine with holes in a solid semiconductor material. The semiconductor material is typically a small chip or die that is cut from a larger semiconductor wafer, the LED die usually being quite small, e.g. on the order of 1 mm×1 mm in size, such that the (solid state) LED source behaves essentially like a point source of light. The semiconductor die may also be mounted in a reflective cup and/or in a transparent encapsulant whose outer surface may be curved to form a lens, or may be flat.

BRIEF SUMMARY

Due to the small point-like nature of many solid state light sources such as LEDs, it can be challenging to design a lighting system that uses such solid state sources while also providing a relatively spatially uniform emitting area of the lighting system, particularly when the lighting system is in the form of an extended tube.

We have developed a new family of lighting systems that comprise a tubular configuration and that use one or more structured surface films to provide an inner structured surface that faces a cavity on the inside of the tube and an outer structured surface that faces the outside of the tube. A light source assembly, which may comprise one or more individual solid state light sources, may be disposed at or near an end of the tube to inject light into the cavity rather than into an edge or end surface of the tube. The inner and outer structured surfaces have linear or otherwise elongated features. One or both of these groups of features are oriented obliquely such that they form helixes along the tube. Depending on design details of the lighting system, such as the number, placement, and output distribution of the light sources and the aspect ratio of the tube, this oblique orientation of one or both of the elongated features of the structured surfaces can help to insure the emitting area of the lighting system has a more spatially uniform appearance, while also enhancing the overall brightness of the emitting area. The emitting area may be the entire outer surface of the tube that is viewable from a given perspective, or in some cases it may be only a portion of that outer surface, such as a slit or aperture that runs longitudinally along the tube. Although the tube may be circular in cross-section, in other cases it can have a cross-sectional shape that is not circular, as well as a shape that is not smoothly curved.

We therefore describe herein, among other things, lighting systems that include a light-transmissive tube and a light source assembly disposed to inject light into a cavity defined by the tube. The cavity extends along a longitudinal axis. At least a portion of the tube includes an inner structured surface facing the cavity, and an outer structured surface facing away from the cavity. The inner structured surface is configured to direct a first portion of the injected light towards the outer structured surface, and to direct a second portion of the injected light back into the cavity. The inner structured surface includes elongated first features and the outer structured surface includes elongated second features. At least one of the elongated first features and the elongated second features are oriented obliquely relative to the longitudinal axis such that they form respective helixes along the tube.

Other aspects of the invention can be found in the appended claims and the detailed description that follows.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 1 is a schematic side or sectional view of a lighting system, and FIG. 1A is an enlarged view of a portion of that lighting system;

FIGS. 24(A)-(G) are grayscale photographs of lighting systems that differ from each other by the orientation of the elongated features of inner and outer structured surfaces relative to the longitudinal axis of the cavity or tube, and where, in each case, a highly reflective endcap and a strip of highly reflective film (forming an extended aperture) was used;

FIG. 28A is a grayscale photograph of a lighting system in which the elongated features of the inner and outer structured surfaces are oriented at 90 degrees to each other and 45 degrees relative to the longitudinal axis of the cavity or tube, the elongated features on the inner and outer structured surfaces being undulating features and lenticular features, respectively, and where a reflective endcap was used but no strip of highly reflective film was used;

FIG. 28B is a grayscale photograph of a lighting system similar to that of FIG. 28A, but where the elongated features on the inner and outer structured surfaces are parallel to each other and perpendicular to the longitudinal axis of the cavity or tube;

In the figures, like reference numerals designate like elements.

DETAILED DESCRIPTION OF ILLUSTRATIVE EMBODIMENTS

Figure 2:
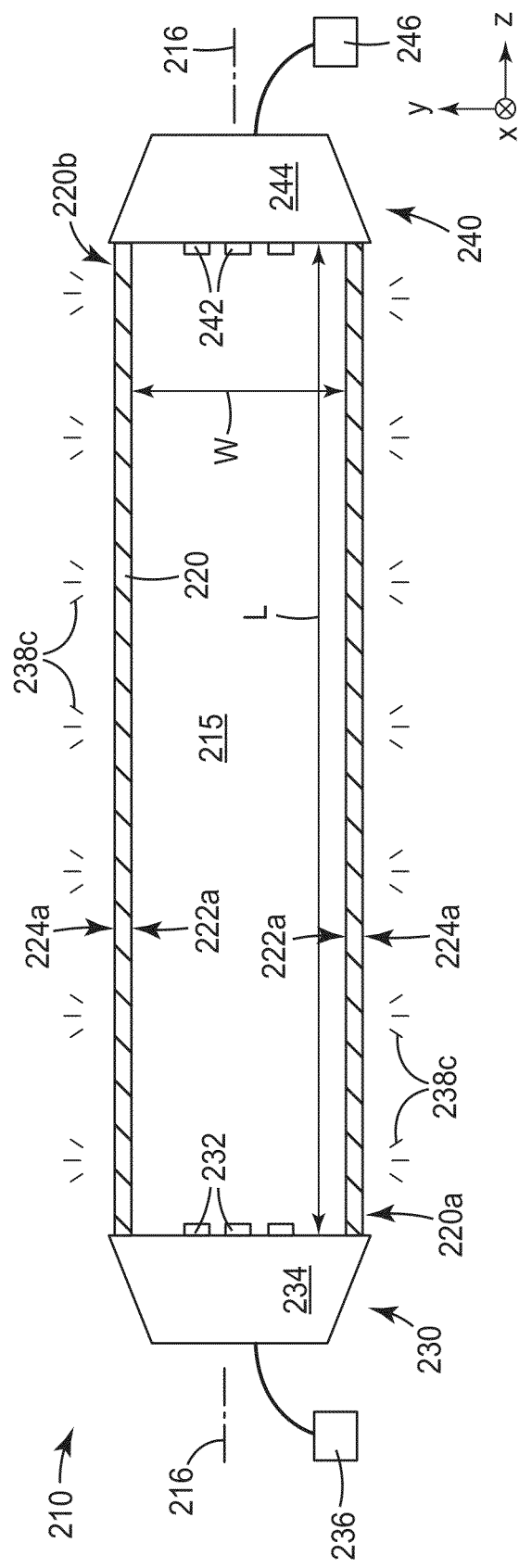
FIG. 2 is a schematic side or sectional view of another lighting system.

We have developed new lighting devices and systems that are generally tubular in construction, that can be used with solid state light sources such as LEDs, and that incorporate structured surfaces on an inside-facing surface and on an outside-facing surface of the tube, these structured surfaces having linear or otherwise elongated surface features. At least some of these surface features are oriented obliquely relative to a longitudinal axis of the tube such that they form helixes along the tube. We have found that this orientation of the elongated surface features can help enhance the spatial uniformity of the brightness across the emitting area of the tube while also providing an increased, high overall brightness. The tube can be made in a variety of different shapes and sizes, and may have a variety of different component parts and construction configurations, as described further below. The tube need not have a circular cross-sectional shape. The disclosed lighting systems can be used as-is in general lighting applications, e.g., as replacements for conventional light bulbs, including cases in which the emitting area of the tube is exposed and visible to a user such as an occupant of a room illuminated by such a lighting system. Alternatively, the disclosed lighting systems can be used as a component part in a bulb, fixture, or the like.

In FIG. 1, a lighting system 110 has a generally tubular construction. For ease of explanation, the system 110 is shown in the context of a Cartesian x-y-z coordinate system. The system 110 includes a light-transmissive tube 120 that defines an interior volume or cavity 115. The cavity 115 may be completely enclosed, or it may be only partially enclosed, such as when the tube 120 is open or uncovered on one end. The tube 120 may have a shape that is circular, or substantially circular, in transverse cross section (e.g. in the x-y plane), or it may have a non-circular shape that may be smoothly curved, or polygonal, or a combination of curved and polygonal. The cross-sectional shape is typically constant and uniform along all or most of its length from a proximal end 120a to a distal end 120b of the tube, but in some cases the shape may not be constant.

The tube 120 and the cavity 115 each extend along a shared longitudinal axis 116, which is parallel to the z-axis of the coordinate system. Macroscopically, the tube 120 and the cavity 115 may be described in terms of their absolute dimensions, and/or their relative dimensions such as aspect ratio. In FIG. 1, L refers to the longitudinal dimension (length) of both the tube 120 and the cavity 115. W refers to the transverse dimension (width or diameter, where diameter is understood broadly to refer to the maximum transverse dimension of any closed shape, not limited to circles) of the cavity 115. In many cases, the walls of the tube 120 are so thin compared to the cavity width W that W can also be used to approximate the width of the tube 120. The aspect ratio of the cavity 115 and tube 120 may thus both equal, or substantially equal, L/W. The lighting system 110 is not particularly limited, but for a typical embodiment the aspect ratio may fall within a range from at least 1 up to 250, or from at least 1 up to 240, or from at least 1 up to 120, or from at least 1 up to 60, or from at least 1 up to 40 or 20. The tube 120 and cavity 115 may also possess certain symmetries, for example, rotational symmetry about the axis 116, and/or mirror symmetry about a plane that contains the axis 116.

A light source assembly 130 is attached to, or otherwise positioned at or near, the proximal end 120a of the tube 120 in order to inject light 138 into the cavity 115. This light injection arrangement is in contrast to a typical light guide, in which the light source injects light into the edge of a solid plate or film. Depending on design details of the assembly 130 and its constituent light source(s), the injected light 138 may be broadband or narrow band, and highly collimated or uncollimated. Furthermore, although most embodiments use injected light 138 that is chiefly or exclusively in the visible spectrum, in some cases the light 138 may be or include ultraviolet light, in combination with a layer or film of phosphor or other down-converting material which absorbs the ultraviolet light and emits the absorbed energy as visible light. The injected light may also comprise infrared light.

The assembly 130 includes a plurality of individual light sources 132, which are preferably light emitting diodes (LEDs) or other solid state light sources. In this regard, a "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

The light sources 132 are mounted on a header or base 134. The base 134 may serve both a mechanical function of keeping the sources 132 in physical alignment and position, and a thermal function of conducting heat away from the sources 132 so they can function at lower operating temperatures. The base 134 may further serve an electrical function of providing electrical connections from a controller 136 to the sources 132. In some cases, the base 134 or other component of the lighting device 110 may also include one or more optical detectors (not shown in FIG. 1), and the output of such detector(s) may then be fed to the controller 136 so the controller can drive the light sources 132 in a closed feedback loop, e.g. to maintain a constant intensity output of the light source assembly 130 and lighting device 110. Although multiple light sources 132 are shown in FIG. 1, the reader will understand that the assembly 130 may include only one such light source 132. If multiple light sources 132 are used, some or all of them may provide substantially the same emission spectrum—i.e., any differences in their emission spectra are minor, such as is typical for unit-to-unit variability; for example, sources that all emit nominally green visible light would be considered to be emitting substantially the same emission spectrum. Alternatively or in addition, some or all of the multiple light sources may provide substantially different emission spectra—i.e., the differences in their emission spectra are greater than typical unit-to-unit variability; for example, a group of three sources, one emitting nominally red light, another emitting nominally green light, and the last emitting nominally blue light, would be considered to be emitting substantially different emission spectra.

As mentioned above, LEDs and similar solid state light sources are typically quite small. The transverse dimension of each of the individual light sources 132 may therefore be a small fraction of the transverse dimension W of the cavity 115 and tube 120. For example, the transverse dimension of each light source 132 may be ⅕[th] or less, or ¹⁄₁₀[th] or less, or ¹⁄₂₀[th] or less, of the transverse dimension W. This disparity in size can pose a challenge to achieving good spatial uniformity of light emitted by the lighting system 110, while also providing a high overall brightness.

Numerous factors can impact the spatial uniformity and overall brightness of a tubular lighting system. Such factors can include the number, position(s), emission spectra, and output distribution(s) of the individual light source(s), the tube or cavity length and width (and aspect ratio), and whether the distal end of the tube is covered with a reflective cap such as optional cap 118 in FIG. 1, and if so, what the reflectivity is of the reflective interior surface 118a of the cap 118. Other factors that can be important are design details of the tube. In the disclosed systems, the tube is light transmissive, which means at least a portion of the tube transmits light. In some cases, the entire tube, or substantially the entire tube, transmits light, while in other cases, another film or films may be used to define one or more longitudinal light-transmissive apertures, discussed further below. At least a portion of the light transmissive part of the tube includes an inner structured surface that faces the cavity, and an outer structured surface that faces away from the cavity. These inner and outer structured surfaces cooperate so that the light 138 injected into the cavity by the light source assembly is emitted as output light 138c along the tube of the lighting system. In this regard, as best seen in the enlarged view of FIG. 1A, the inner structured surface 122a is configured to direct a first portion 138a of the injected light 138 towards the outer structured surface 124a, and to direct a second portion 138b of the injected light 138 back into the cavity 115. The portion 138b directed back into the cavity helps to provide illumination at more distal portions of the tube 120. The portion 138a is mostly, or at least partially, transmitted—as well as defocused and/or focused and/or otherwise redirected—by the outer structured surface 124a to provide the output light 138c.

In the disclosed lighting systems, the inner and outer structured surfaces incorporate linear or otherwise elongated surface features, such as elongated prismatic or lenticular (lens-like) structures. The elongated structures or features can in some cases have an indefinite or unlimited length, and in other cases they may be interrupted or discontinuous along their length. In FIG. 1A, inner structured surface 122a includes elongated features 121, and outer structured surface 124a includes elongated features 123. In the embodiment shown, the elongated features 121 are prismatic, with substantially planar side surfaces and a relatively sharp peak, and the elongated features 123 are lenticular, with substantially curved surfaces and a more rounded peak. The linear or elongated nature of the elongated features 121, 123 is not apparent in the cross-sectional view of FIG. 1A. Nevertheless, the features 121, 123 are linear or otherwise elongated along respective axes in a given vicinity of the tube 120. And one or both of these features are oriented obliquely relative to the longitudinal axis such that they form respective helixes along the tube 120. This is discussed more fully and shown below in FIGS. 3A-3C. The tube 120 can be constructed in numerous possible ways. In FIG. 1A, it is shown as having a 3-part construction: a reinforcing cylinder or sleeve 125, an inner structured film 122, and an outer structured film 124. The inner and outer structured films 122, 124 each have one major surface that is structured and an opposed major surface that is flat or smooth. The flat major surface of these films can be attached to smooth inner and outer surfaces of the sleeve 125, e.g. using an optically clear adhesive or other suitable bonding agent. Other possible constructions of the tube are discussed below starting with FIG. 13.

The tube 120 may optionally include a cap such as cap 118 that fully or partially closes the distal end 120b of the tube, and that causes the cavity 115 to be a closed cavity rather than an open cavity. Such a cap 118 would typically include an inner surface 118a that has a high reflectivity for the injected light 138. The high reflectivity of the surface 118a may be specular, diffuse, or semi-specular, as discussed further below. The reflective surface 118a of the cap 118 causes light that would otherwise be emitted from the distal end 120b of the tube to be reflected back into the cavity 115. The structured surfaces 122a, 124a can then intercept such light and direct it out of the tube, in order to increase the intensity and in some cases also the uniformity of the output light 138c.

If the cap 118 is omitted, the tube 120 may be open-ended. Alternatively, another light source assembly may be placed at that end of the tube, opposite the light source assembly 130. Such an embodiment is shown in FIG. 2. In that figure, a lighting system 210 also has a generally tubular construction. The lighting system 210 is shown in the context of a Cartesian x-y-z coordinate system in the same manner as FIG. 1. The lighting system 210 includes: a light-transmissive tube 220 that defines an interior volume or cavity 215 and has a proximal end 220a, a distal end 220b, and a longitudinal axis 216, the cavity and/or the tube having a longitudinal and transverse dimension L and W; an inner structured surface 222a facing the cavity 215 and an outer structured surface 224a facing away from the cavity 215; a light source assembly 230 having one or more light sources 232 mounted on a header or base 234, and connected to a controller 236. These elements may be the same as or similar to their counterparts in the embodiment of FIG. 1, and to avoid needless repetition will not be discussed further here.

In addition to the light source assembly 230 at the proximal end 220a, the lighting system 210 also includes a second light source assembly 240 at the opposite or distal end 220b of the tube 220. The light source assembly 240 may have substantially the same construction and design as the assembly 230, or it may be substantially different. For example, the assemblies 230, 240 may have the same number of individual light sources 232, 242, and they may emit substantially the same color or spectral distribution of light, and substantially the same brightness of light, and they may emit light in substantially the same output distribution (degree of collimation), or alternatively any one, some, or all of these design factors may be substantially different for the two assemblies 230, 240. For simplicity, FIG. 2 shows the assembly 240 as having the same or similar construction as assembly 230: the assembly 240 includes one or more light sources 242 mounted on a header or base 244, and connected to and controlled by a controller 246. The light sources 242, base 244, and controller 246 may be the same as or similar to light sources 232, base 234, and controller 236, respectively. Thus, the light source assembly 230 injects light into the cavity 215 from the proximal end 220a, and light source assembly 240 injects light into the cavity 215 from the distal end 220b.

Just as in lighting system 110, the inner and outer structured surfaces 222a, 224a of lighting system 210 cooperate so that the light injected into the cavity by the light source assembly 230, as well as the light injected into the cavity by the light source assembly 240, is emitted as output light 238c along the tube of the lighting system. The inner structured surface 222a is configured to direct a first portion of such injected light towards the outer structured surface 224a, and to direct a second portion of the injected light back into the cavity 215. The portion directed back into the cavity helps to provide illumination at portions of the tube 220 farther from the light source at issue. The light portion that is directed from the inner structured surface 222a to the outer structured surface is mostly, or at least partially, transmitted—as well as defocused and/or focused and/or otherwise redirected—by the outer structured surface 224a to provide the output light 238c.

The lighting systems of FIGS. 1 and 2, and the other lighting systems disclosed herein, may have a modular construction such that parts of the lighting system are separable from each other to allow for replacement by other parts, and/or, at the time of purchase, can be offered as a collection of different parts so the buyer of the lighting system can select which parts to combine. For example, the buyer may purchase, or may be presented with, a collection of tube types, e.g. having different lengths and aspect ratios, and/or having different structured surface geometries and/or orientations, as well as a collection of light source assemblies, e.g. having different numbers of LEDs and/or different LED types (different output spectra and/or different angular output distributions). The buyer may then make selections from these collections of different parts and combine the selected parts into a lighting system designed for the buyer's particular application.

As mentioned above, the inward-facing and outward-facing structured surfaces of the tube have linear or otherwise elongated surface features, and the surface features of one or both of these structured surfaces extend along respective axes that are obliquely oriented relative to the longitudinal axis of the tube such that they form helixes or spirals along the tube. One such arrangement is shown schematically in FIG. 3A.

In that figure, a lighting system 310a includes a light source assembly 330a coupled to a light transmissive tube 320a. The tube 320a, which may be open-ended or closed-ended, defines a cavity 315a and has a longitudinal axis 316a, as well as inward- and outward-facing structured surfaces (not labeled). The light source assembly 320 has individual light sources 332a, such as LEDs, that inject light into the cavity 315a. The inward-facing structured surface directs a first portion of the injected light towards the outward-facing structured surface, and directs a second portion of the injected light back into the cavity 315a. The outward-facing structured surface defocuses, focuses, or otherwise redirects most or at least some of the light transmitted by the inward-facing structured surface, and directs it generally outward from the tube 320a, to produce the output light of the lighting system 310a, as discussed above in connection with FIGS. 1 and 2. The light directing or redirecting properties of the inward- and outward-facing structured surfaces may be the result of reflection and/or refraction, and in some cases diffraction, from the respective surface features on such surfaces.

Figure 3A:
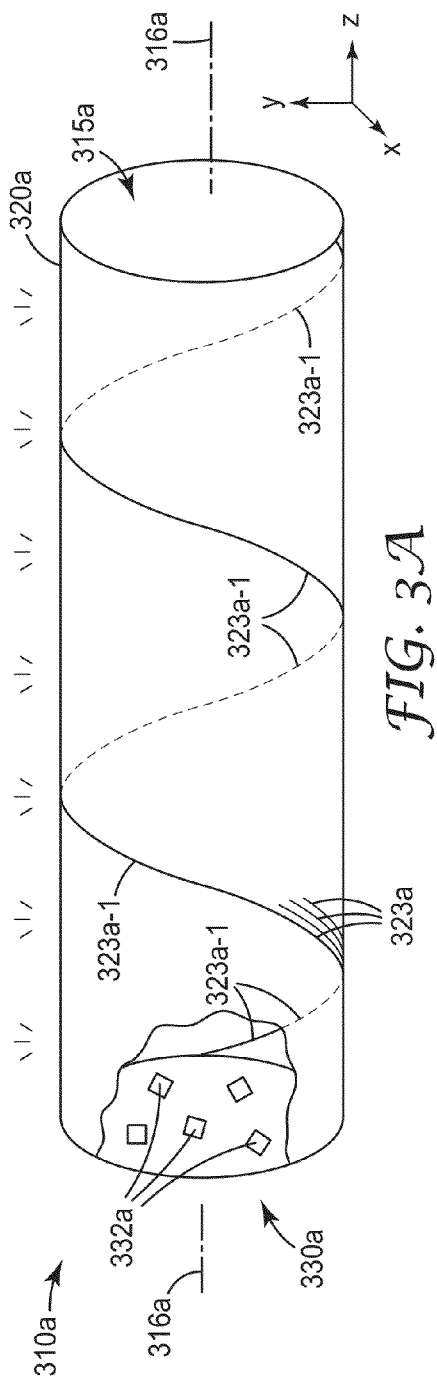
FIG. 3A is a schematic perspective view of another lighting system, where elongated features of an outer or inner structured surface are schematically illustrated.

The size of the individual surface features on the inward- and outward-facing structured surfaces are typically very small, e.g., in many cases the spacing of the individual surface features on a given structured surface is less than 1 mm, or less than 0.5 mm, or less than 0.25 mm, or even less than 0.1 mm. In such cases a user or viewer of the lighting device may very well not notice, and may not be able to easily detect, the topography of these inner and/or outer structured surfaces. Nevertheless, the surface features of one or both of these structured surfaces are desirably oriented obliquely relative to the longitudinal axis of the tube or cavity so as to form spirals or helixes. In FIG. 3A, individual surface features are represented schematically by reference numeral 323a. Only a representative few of the surface features 323a are shown in the drawing for clarity, but the reader will understand that the features may occupy the entire major surface of the structured surface at issue. The surface features 323a may represent surface features on the outward-facing structured surface, or on the inward-facing structured surface of the tube 320a. As the figure shows, at any given point or localized area on the structured surface, the surface features 323a are oriented obliquely relative to the longitudinal axis 316a, and as a result, these features form a set of non-intersecting spirals that wind around the tube 320a. From the group of surface features 323a, one surface feature 323a-1 is singled out and drawn in its entirety from the proximal to the distal end of the tube, to show more clearly the multiple-turn helix that it forms along the tube. Note, however, that in some embodiments the inner and outer structured surfaces may form only a part of the tube, e.g. as shown and discussed further below they may form only one, or several, isolated longitudinal light-emitting apertures along the tube. But even in such cases the obliquely oriented surface features can be said to form helixes, even though any given helix may form only a fraction (e.g., less than half) of one complete turn around the tube.

Figure 3B:
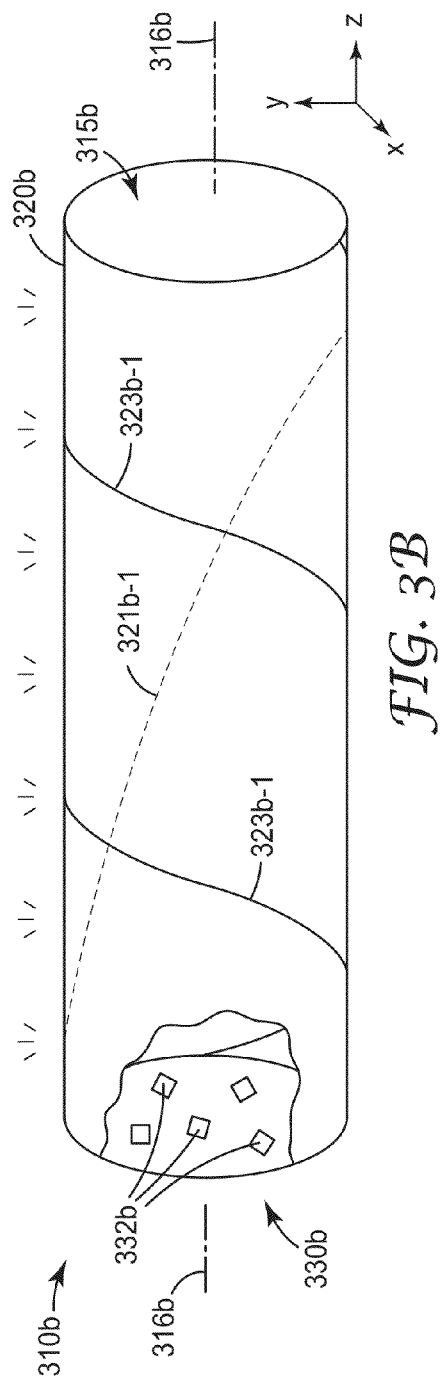
FIG. 3B is a schematic perspective view of another lighting system, where an elongated feature of an outer structured surface, and an elongated feature of an inner structured surface, are schematically illustrated.

FIG. 3B is a schematic view of another tubular lighting system 310b. The lighting system 310b may be the same as or similar to lighting system 310a of FIG. 3A. The lighting system 310b includes a light source assembly 330b (with individual LED or solid state light sources 332b) coupled to a light transmissive tube 320b, which may be open-ended or closed-ended, and which defines a cavity 315b and a longitudinal axis 316b, as well as inward- and outward-facing structured surfaces (not labeled). The tube 320b and assembly 330b may be the same as or similar to corresponding components of the lighting system 310a, and to avoid needless repetition all pertinent aspects of these components need not be repeated here. But the inward- and outward-facing structured surfaces of the tube 320b cooperate to receive light from the light source assembly and direct it outwardly from an emitting area of the tube, as discussed above, and these structured surfaces may occupy the entire outer surface of the tube, or, in some embodiments, only one or more isolated longitudinal emitting apertures.

In FIG. 3B, for ease of explanation, one surface feature 323b-1 from the outward-facing structured surface is shown isolated from its set of surface features, and one surface feature 321b-1 from the inward-facing structured surface is shown isolated from its set of surface features, on the surface of the tube 320b. In this embodiment, at any given point or isolated area of the tube, the surface features of the outward-facing structured surface (including surface feature 323b-1) and the surface features of the inward-facing structured surface (including surface feature 321b-1) are all oriented obliquely relative to the longitudinal axis 316b, and thus form two sets of parallel helixes. These two sets of helixes also have a relative angle of intersection between them. (We refer to an angle of intersection between the sets of helixes or between the sets of surface features even though the surface features on the inward-facing structured surface do not physically intersect the surface features on the outward-facing structured surface.) The two sets of helixes may be oriented symmetrically about the longitudinal axis 316b, in which case the axis 316b bisects the angle of intersection between the sets of helixes. Alternatively, the helix sets may be oriented asymmetrically with respect to the longitudinal axis.

Figure 3C:
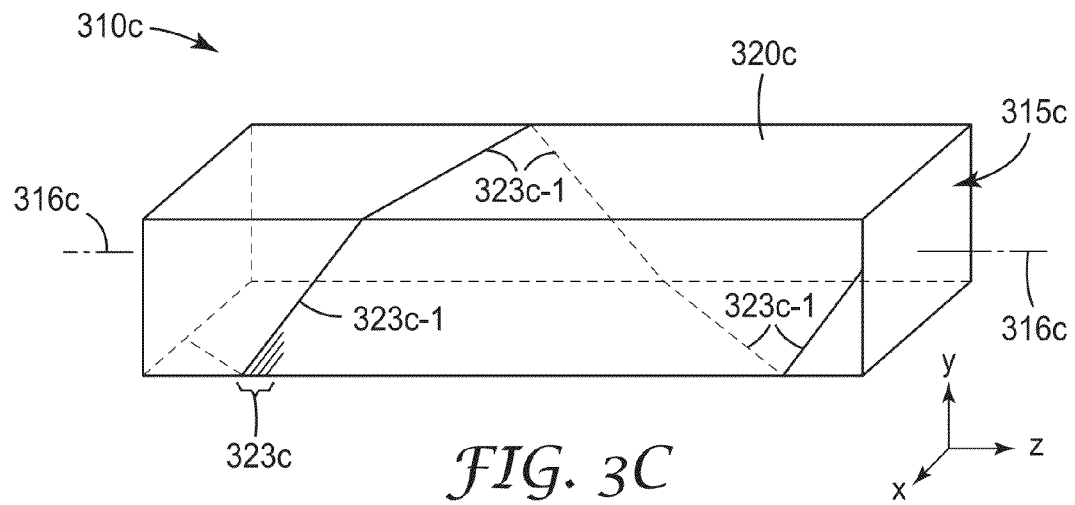
FIG. 3C is a schematic perspective view of another lighting system, where elongated features of an outer or inner structured surface are schematically illustrated.

FIG. 3C shows an embodiment of a lighting system 310c in which the helixes formed by the obliquely oriented surface features are piecewise linear rather than continuously curved. This is because in the lighting system 310c, the light-transmissive tube 320c has flat sides, and a polygonal shape in transverse cross-section. The tube 320c defines an open or closed cavity 315c, and has a longitudinal axis 316c. The tube 320c also has an inner structured surface that faces the cavity 315c, and an outer structured surface that faces away from the cavity, and each of these structured surfaces have linear or otherwise elongated surface features as discussed above. One or both of the sets of surface features may be obliquely oriented relative to the longitudinal axis. In FIG. 3C, individual surface features are represented schematically by reference numeral 323c. Only a representative few of the surface features 323c are shown in the drawing, and the reader will understand that the features may occupy the entire major surface of the structured surface at issue. The surface features 323c may represent surface features on the outward-facing structured surface, or on the inward-facing structured surface of the tube 320c. As the figure shows, at any given point or localized area on the structured surface, the surface features 323c are oriented obliquely relative to the longitudinal axis 316c, and as a result, these features form a set of non-intersecting spirals that wind around the tube 320c. From the group of surface features 323c, one surface feature 323c-1 is singled out and drawn in its entirety from the proximal to the distal end of the tube, to show more clearly the one-plus-turn helix that it forms along the tube. In some embodiments the inner and outer structured surfaces may form only a part of the tube, e.g. as shown and discussed further below they may form only one, or several, isolated longitudinal light-emitting apertures along the tube. But even in such cases the obliquely oriented surface features can be said to form helixes, even though any given helix may form only a fraction (e.g., less than half) of one complete turn around the tube.

Figure 4:
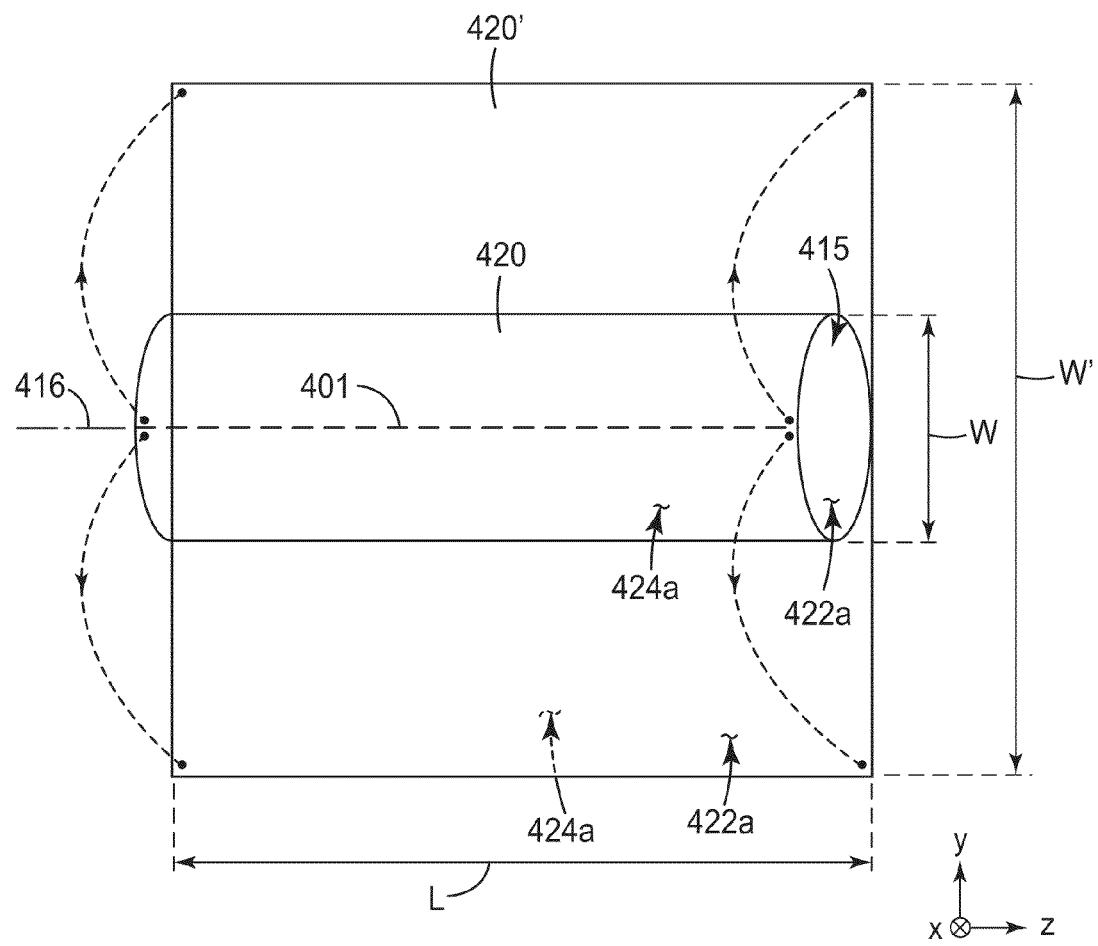
FIG. 4 is a schematic perspective view of a light transmissive tube suitable for use in the disclosed lighting systems, the figure also showing how the tube can be slit along its length so that the film or films forming the tube can be laid flat in order to more clearly describe the structured surfaces of such film(s)

The various orientations of the linear or elongated surface features relative to the longitudinal axis of the tube can be more clearly shown by opening up and flattening out the tube so that it lies in a plane. This concept is shown in FIG. 4. There, a light transmissive tube 420 from one of the disclosed lighting systems defines a cavity 415 and extends along a longitudinal axis 416. The tube is cut or slit along a longitudinal cut line 401, and the tube, with all of its component films or other parts (ignoring any endcap that may be present) is then unrolled or unfolded to form a "flattened tube" or sheet 420'. The tube 420, which has a longitudinal dimension L and a transverse dimension W, produces a flattened tube of the same longitudinal dimension L but a larger transverse dimension W'. The dimension W' is the circumference of the original tube; hence, if the tube 420 has a circular cross-sectional shape, then W'=π×W. For purposes of this FIG. 4 and FIGS. 5A through 5F below, we assume the tube is flattened in such a way as to preserve the longitudinal axis of the original (rolled-up) tube, unless otherwise stated. The flattened tube may thus lie in or parallel to the y-z plane, with the z-axis being parallel to the longitudinal axis 416 of the original tube. Because of the way we have formed the flattened tube 420' using the longitudinal cut line 401, the top and bottom edges of the flattened tube 420' are parallel to the z-axis and to the axis 416. Also, the upper major surface 422a of the flattened tube 420' is the same as the inner structured surface 422a of the tube 420, and the lower major surface 424a of the flattened tube 420' is the same as the outer structured surface 424a of the tube 420. With this background, we can use the flattened tubes of FIGS. 5A through 5F to show some examples of how the elongated surface features can be oriented relative to the longitudinal axis of the tube.

Figure 5A:
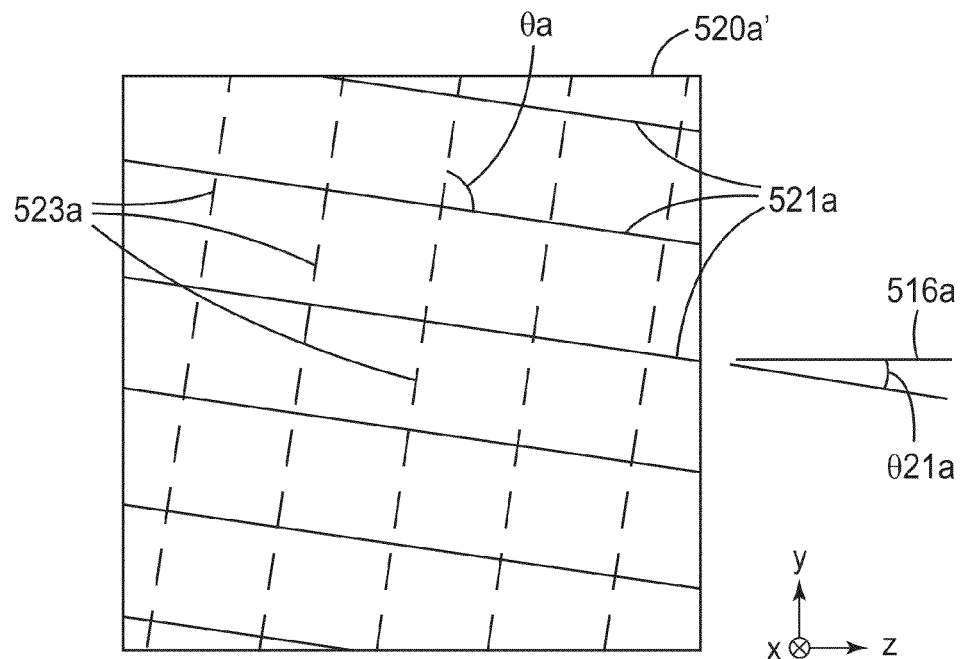
FIG. 5A is a schematic plan view of a flattened tube, where elongated features of an outer structured surface and elongated features of an inner structured surface are included in the illustration.

FIGS. 5A through 5F all show examples in which both the elongated surface features of the inner structured surface, and the elongated features of the outer structured surface, are oriented obliquely relative to the longitudinal axis of the tube, The reader will understand that this means that when the flattened tubes of FIGS. 5A through 5F are rolled up (the reverse process of FIG. 4), folded up, or otherwise un-flattened so as to form a tube of a desired cross-sectional shape, the elongated surface features of the inner structured surface will form a first set of helixes, and the elongated surface features of the outer structured surface will form a second set of helixes. In FIG. 5A, a flattened tube 520a' has an upper major surface (corresponding to the inner structured surface of the associated tube) with linear or elongated features 521a, and a lower major surface (corresponding to the outer structured surface of the associated tube) with linear or elongated features 523a. The elongated features 521a make an angle of θ21a relative to the z-axis and to the longitudinal axis 516a of the tube. The included angle, or angle of intersection (from a plan view perspective), between the features 521a and 523a is θa.

Figure 5B:
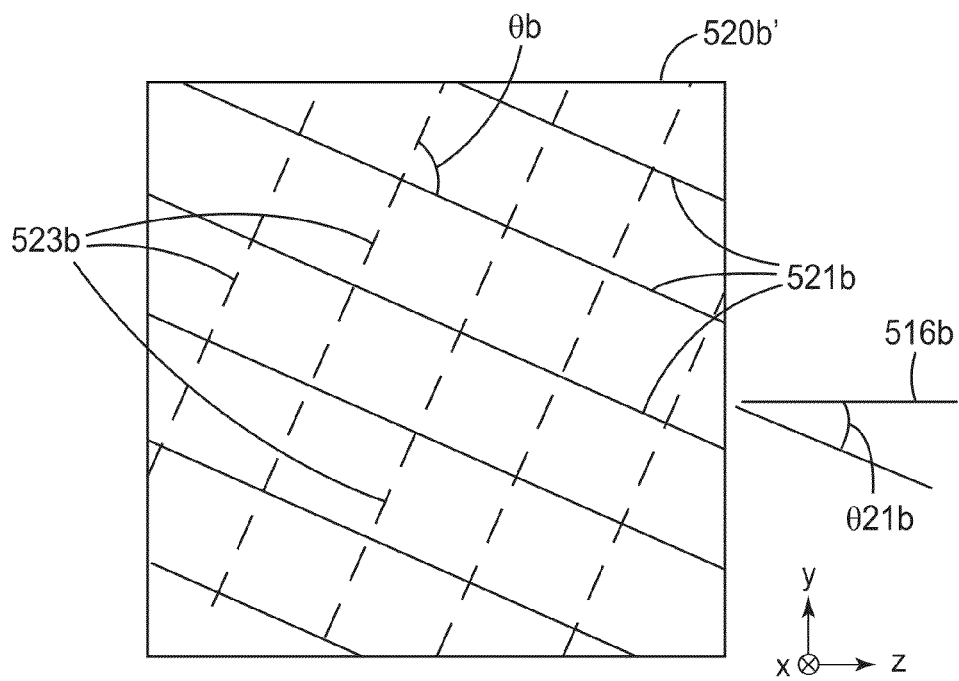
FIGS. 5B-F are similar schematic plan views of additional flattened tubes.

In FIG. 5B, a flattened tube 520b' has an upper major surface (corresponding to the inner structured surface of the associated tube) with linear or elongated features 521b, and a lower major surface (corresponding to the outer structured surface of the associated tube) with linear or elongated features 523b. The elongated features 521b make an angle of θ21b relative to the z-axis and to the longitudinal axis 516b of the tube. The included angle, or angle of intersection (from a plan view perspective), between the features 521b and 523b is θb.

Figure 5C:
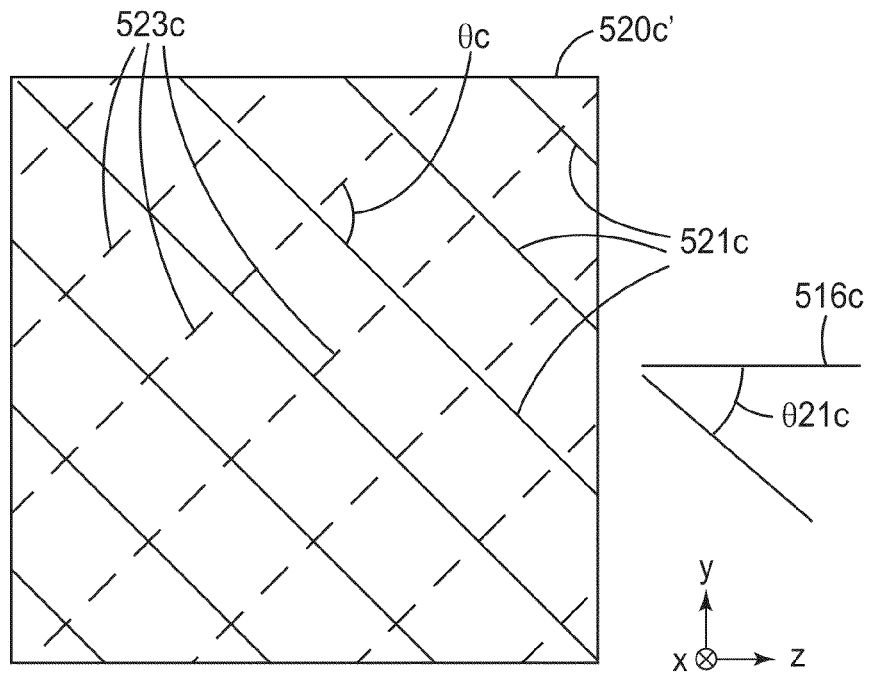
Figure 5D:
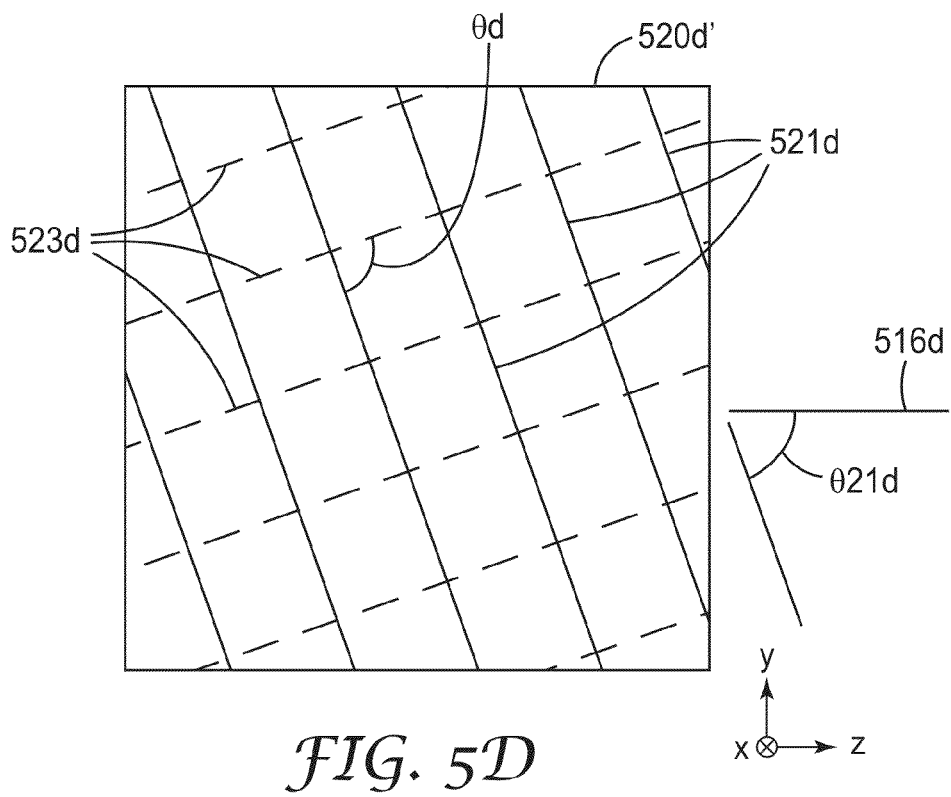

In FIG. 5C, a flattened tube 520c' has an upper major surface (corresponding to the inner structured surface of the associated tube) with linear or elongated features 521c, and a lower major surface (corresponding to the outer structured surface of the associated tube) with linear or elongated features 523c. The elongated features 521c make an angle of θ21c relative to the z-axis and to the longitudinal axis 516c of the tube. The included angle, or angle of intersection (from a plan view perspective), between the features 521c and 523c is θc. In FIG. 5D, a flattened tube 520d' has an upper major surface (corresponding to the inner structured surface of the associated tube) with linear or elongated features 521d, and a lower major surface (corresponding to the outer structured surface of the associated tube) with linear or elongated features 523d. The elongated features 521d make an angle of θ21d relative to the z-axis and to the longitudinal axis 516d of the tube. The included angle, or angle of intersection (from a plan view perspective), between the features 521d and 523d is θd.

The sequence of figures from 5A to 5D illustrate steadily increasing the magnitude of the oblique angle between the elongated features of the upper major surface (corresponding to the inner structured surface of the associated tube), with 0 degrees<θ21a<θ21b<θ21c<θ21d<90 degrees. Meanwhile, if we assume that the intersection angle between the elongated features on the inner and outer structured surfaces is held constant, e.g., θa=θb=θc=θd≈90 degrees (as shown in the figures), then the oblique angle between the elongated features of the lower major surface (corresponding to the outer structured surface of the associated tube) and the longitudinal axis of the tube steadily decrease as one progresses from FIG. 5A to FIG. 5D. The magnitude of the oblique angle that the elongated features of the inner structured surface make with the longitudinal axis of the tube can be used to control how "quickly" (as measured in terms of a longitudinal distance from the light source assembly) light is extracted from the tube, versus how far (again as measured in terms of longitudinal distance from the light source assembly) light can be made to propagate down the length of the tube. The smaller this angle is (in the limit, the elongated features of the inner structured surface are almost parallel to the longitudinal axis), the farther light propagates down the tube. Conversely, the greater this angle is (in the limit, the elongated features of the inner structured surface are almost perpendicular to the longitudinal axis), the more "quickly" light is extracted from the tube, and the shorter distance light propagates down the tube. Under a given set of conditions, such as light source type and number, tube length, and tube or cavity aspect ratio, we can use this angular dependence of light extraction to select a particular oblique angle that balances light extraction from the tube with light propagation down the tube, so as to achieve, for example, a more spatially uniform illumination along the tube.

Furthermore, the angle that the elongated features of the outer structured surface make with the longitudinal axis of the tube can also be used to tailor how light is extracted from the tube, and how it is reflected back towards the cavity. This angle can also be selected, in conjunction with the oblique angle associated with the elongated features of the inner structured surface, and in conjunction with the other set of conditions such as light source type and tube length and aspect ratio, to provide another degree of freedom with which enhanced spatial uniformity and/or enhanced overall brightness of the lighting system can be achieved.

Figure 5E:
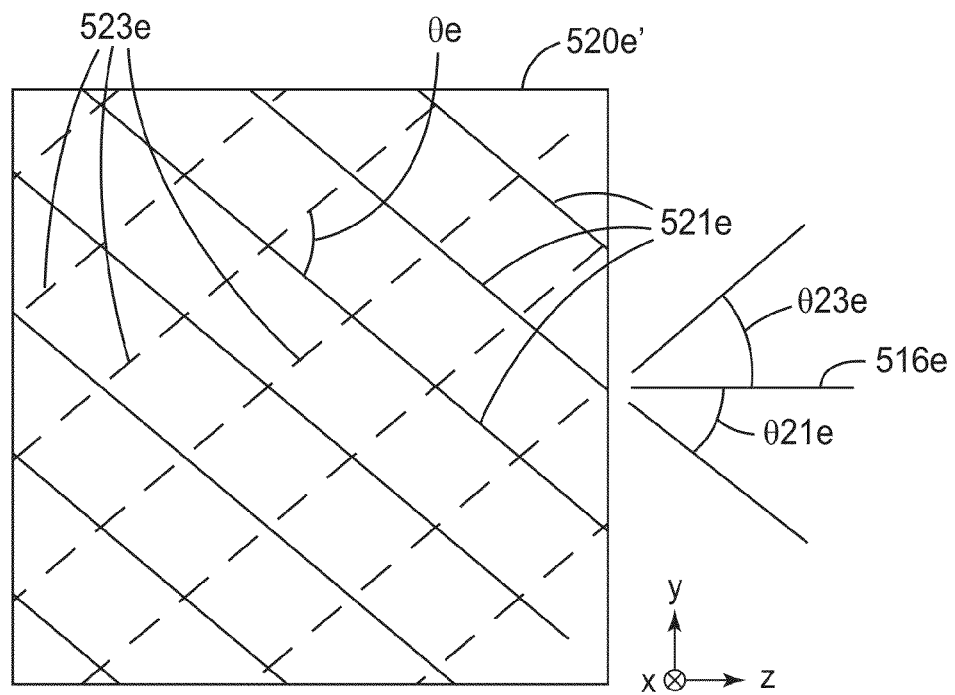
Figure 5F:
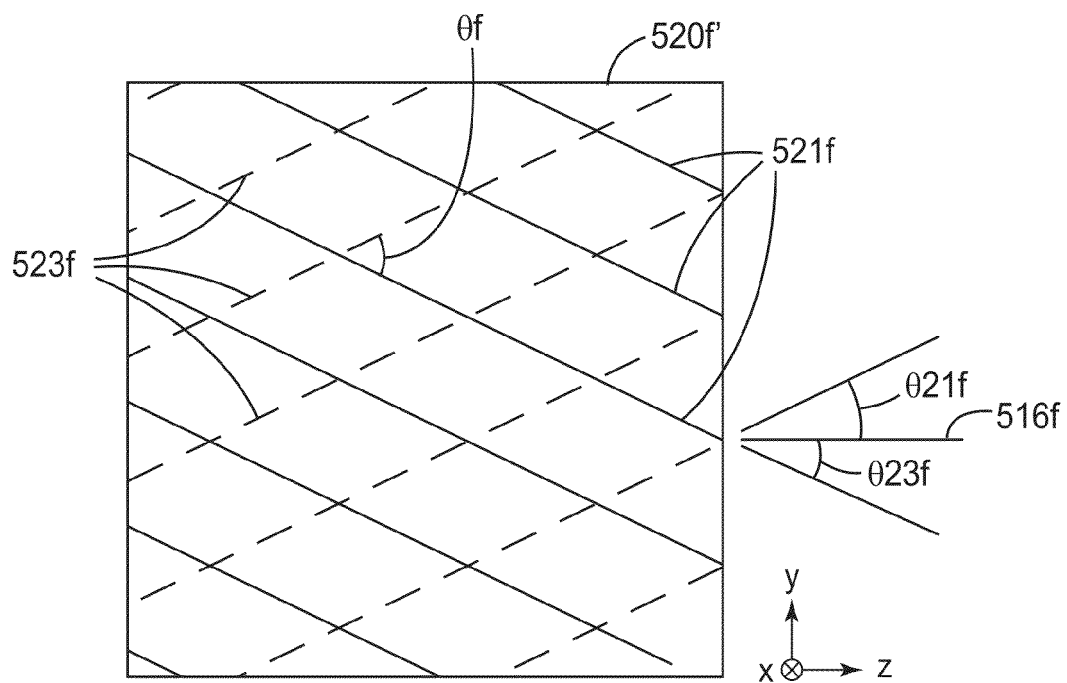

FIGS. 5E and 5F are schematic plan view of flattened tubes similar to those of FIGS. 5A through 5D, but where the elongated features are drawn to be symmetrically oriented with respect to the longitudinal axis of the tube. This occurs when the angle between the elongated features of the inner structured surface and the longitudinal axis is equal in magnitude but opposite in sign to the angle between the elongated features of the outer structured surface and the longitudinal axis. Stated differently, this occurs when the longitudinal axis of the tube bisects an included angle between the elongated features of the inner structured surface and the elongated features of the outer structured surface. In the original (non-flat) tube, this condition translates into helixes that are oriented symmetrically about the longitudinal axis, i.e., an included angle between the sets of helixes is bisected by the longitudinal axis of the tube. In some cases, such symmetry can be used to enhance the spatial uniformity and/or overall brightness of the lighting system.

Thus, in FIG. 5E, a flattened tube 520e' has an upper major surface (corresponding to the inner structured surface of the associated tube) with linear or elongated features 521e, and a lower major surface (corresponding to the outer structured surface of the associated tube) with linear or elongated features 523e. The elongated features 521e make an angle of $\theta 21e$ relative to the z-axis and to the longitudinal axis 516e of the tube, and the elongated features 523e make an angle of $\theta 23e$ relative to that axis. The angle of intersection (from a plan view perspective), or included angle, $\theta e$ between the elongated features 521e, 523e is bisected by the axis 516e.

FIG. 5F shows a flattened tube where the oblique angles of the elongated features relative to the longitudinal axis are smaller than those of FIG. 5E. In FIG. 5E, a flattened tube 520f has an upper major surface (corresponding to the inner structured surface of the associated tube) with linear or elongated features 521f, and a lower major surface (corresponding to the outer structured surface of the associated tube) with linear or elongated features 523f. The elongated features 521f make an angle of $\theta 21f$ relative to the z-axis and to the longitudinal axis 516f of the tube, and the elongated features 523f make an angle of $\theta 23f$ relative to that axis. The angle of intersection (from a plan view perspective), or included angle, Of between the elongated features 521f, 523f is bisected by the axis 516f.

FIGS. 6 through 9 are enlarged views illustrating some elongated surface features that may be used in the inner and outer structured surfaces of the light transmissive tubes. These figures should not be construed to imply that these are the only types of extended surface features that may be used in the disclosed lighting systems. For example, as noted above, although the elongated features may in some cases have an indefinite or unlimited (continuous) length, in other cases they may be interrupted and discontinuous along their length. The Cartesian coordinates that are illustrated in these figures, and in particular the orientation of those coordinates with respect to the structured surfaces, is not necessarily consistent with the orientation of the Cartesian coordinates in FIGS. 1 through 5F. This change in coordinate orientation is done only to follow the convention that when discussing an optical film or structured surface thereof, the z-axis is often oriented perpendicular to the plane of the film. Unless otherwise indicated, the structured surfaces exemplified in FIGS. 6-9, and other structured surfaces disclosed herein, may be used in any combination for the inner and outer structured surfaces of the light transmissive tube. For example, linear lenticular surface features such as those of FIG. 7 may be used both for the inner structured surface and for the outer structured surface of a tube. Alternatively, undulating elongated surface features such as those of FIG. 9 may be used for the inner structured surface, and linear lenticular surface features such as those of FIG. 7 may be used for the outer structured surface.

Figure 6:
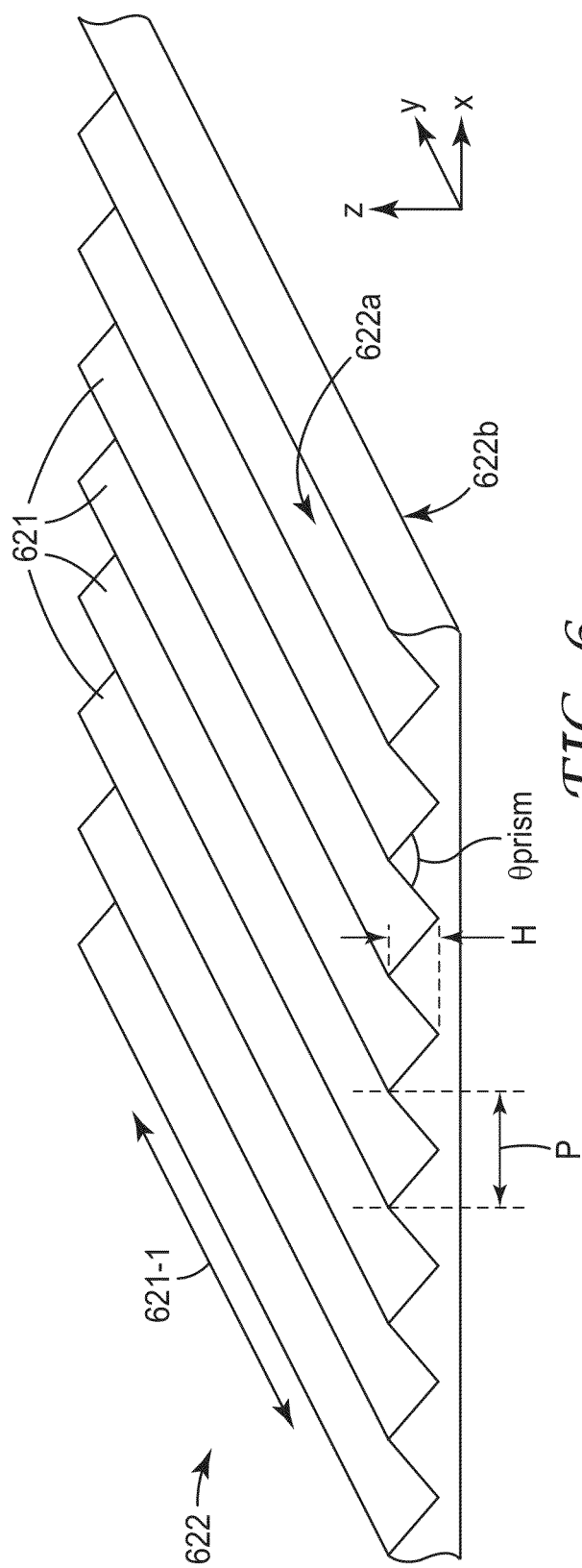
FIG. 6 is an enlarged schematic perspective view of a structured surface with elongated prismatic features, which have prismatic cross-sectional shapes.

In FIG. 6, a film 622 has a structured major surface 622a opposite a flat or smooth major surface 622b. This film can be used in the construction of a light transmissive tube such that the structured surface 622a is used as an inner structured surface and/or an outer structured surface of the tube. The structured surface 622a has an array of distinct elongated prismatic features 621. The features 621 each extend parallel to a feature axis 621-1, which in this case is parallel to the y-axis. Each feature 621 may have substantially flat or planar side surfaces that meet along a sharp peak or ridge of the feature. In a cross-sectional plane perpendicular to the feature axis 621-1, the features 621 exhibit a prismatic shape, characterized by a prism angle $\theta$prism, a height H, and a pitch (feature-to-feature distance) P. Variations on this basic geometry are also contemplated. For example, the peak or ridge of the features may be somewhat rounded, the height H may not be uniform—both with respect to feature-to-feature height (some prismatic features may have a different (greater or lesser) height H than others), and with respect to a single feature (the height H of a given prismatic feature may change along the length of the feature)—and the pitch P may not be uniform—both with respect to feature-to-feature pitch (the pitch of one group of prismatic features on the structured surface 622a may be different (greater or lesser) than the pitch of another group of prismatic features), and with respect to a single feature (the pitch P of a given prismatic feature relative to its neighboring features may change along the length of the feature, e.g. as a result of a change in the transverse dimension (width) of the feature along its length). Prismatic structured surface films that may provide a suitable prismatic structured surface in the disclosed lighting systems include any of the 3M™ Vikuiti™ Brightness Enhancement Films (BEF), and any of the 3M™ Vikuiti™ Transmissive Right Angle Films (TRAF) that are or have been offered for sale by 3M Company, St. Paul, Minn.

Figure 7:
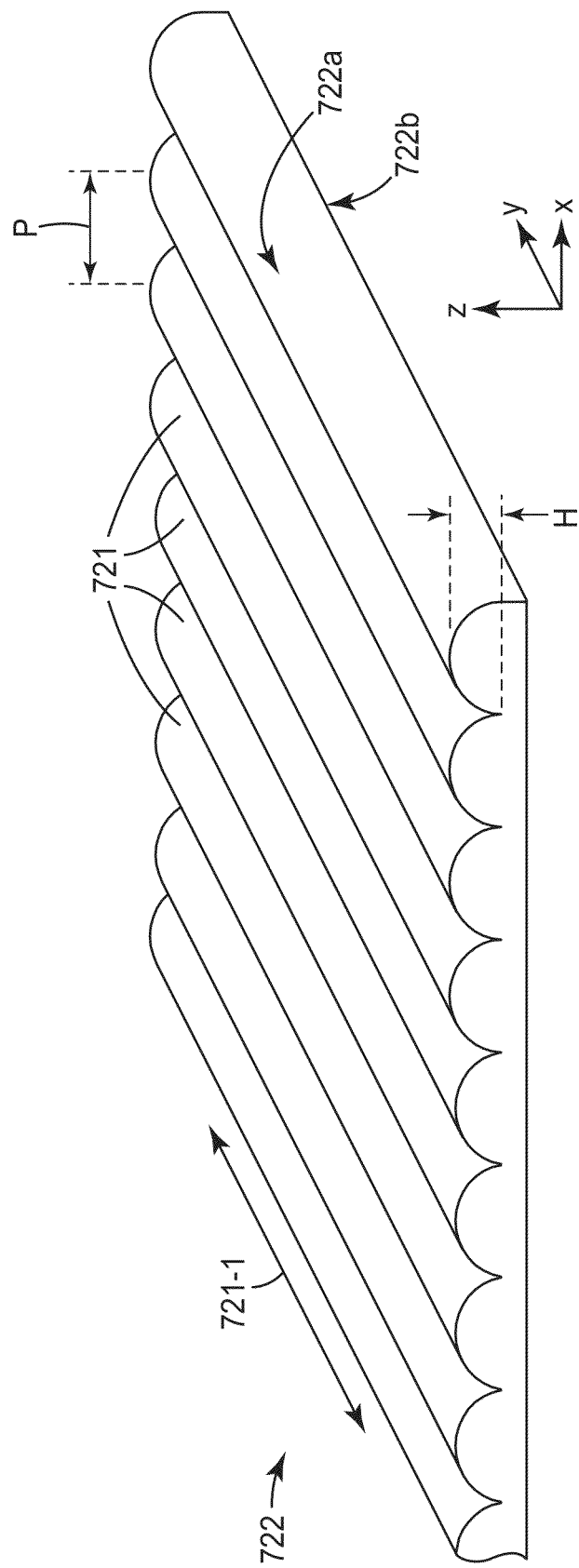
FIG. 7 is an enlarged schematic perspective view of a structured surface with elongated lenticular features, which have lenticular cross-sectional shapes.

In FIG. 7, a film 722 has a structured major surface 722a opposite a flat or smooth major surface 722b. This film can be used in the construction of a light transmissive tube such that the structured surface 722a is used as an inner structured surface and/or an outer structured surface of the tube. The structured surface 722a has an array of distinct elongated lenticular features 721. The features 721 each extend parallel to a feature axis 721-1, which is parallel to the y-axis. Each feature 721 has a curved lens-like (lenticular) surface that is flat or rounded at the top of the feature. In a cross-sectional plane perpendicular to the feature axis 721-1, the features 721 exhibit a lenticular shape. This shape may have a constant curvature, as in the case of an arc of a circle, or it may have a variable curvature, e.g., less curvature at the top than at the base, or more curvature at the top than at the base. A variable curvature shape of particular interest is one defined by a Bezier function, as discussed further below. In addition to the precise nature of the surface curvature, the features 721 on the surface 722a may also be characterized by a height H and a pitch (feature-to-feature distance) P. The height H and/or pitch P may be uniform over the entire structured surface 722a, or either or both of them may change from feature-to-feature, or along a given feature, as discussed above in connection with FIG. 6. An example of a lenticular structured surface film that may provide a suitable lenticular structured surface in the disclosed lighting systems is 3M™ Uniformity Tape sold by 3M Company, St. Paul, Minn.

Figure 8:
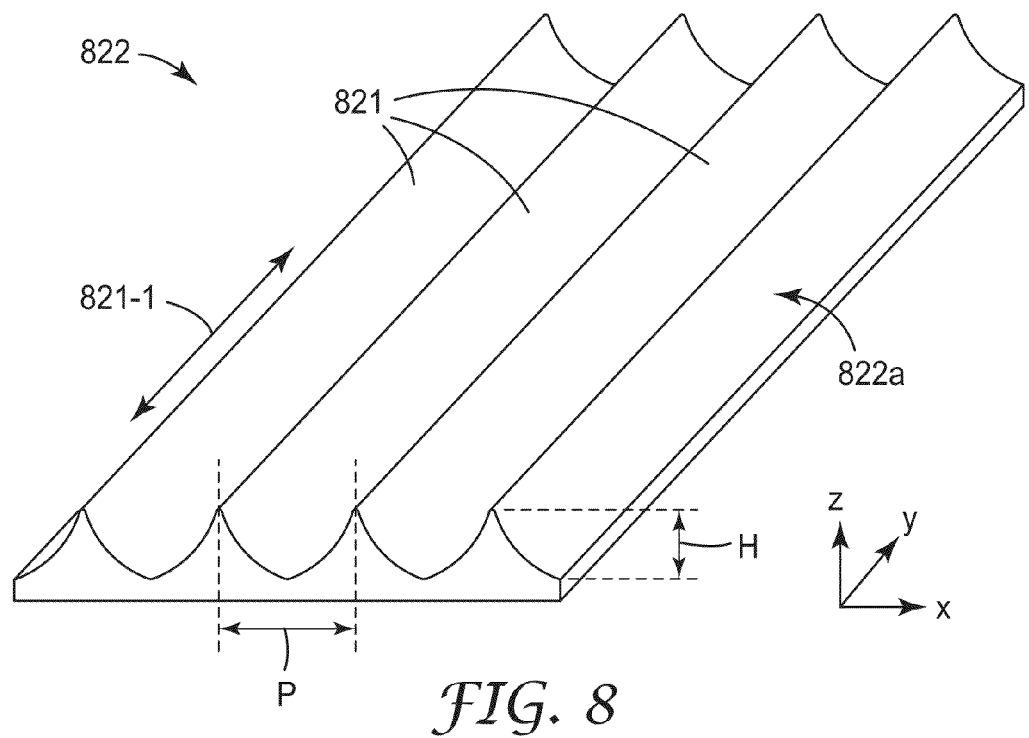
FIG. 8 is an enlarged schematic perspective view of a structured surface with other elongated features that have curved side surfaces.

FIG. 8 shows an example of another structured surface whose elongated features have curved surfaces in transverse cross-section. In FIG. 8, a film 822 has a structured major surface 822a opposite a flat or smooth major surface 822b. This film can be used in the construction of a light transmissive tube such that the structured surface 822a is used as an inner structured surface and/or an outer structured surface of the tube. The structured surface 822a has an array of distinct extended features 821. The features 821 each extend parallel to a feature axis 821-1, which is parallel to the y-axis. Each feature 821 has curved side surfaces that meet at a highly curved (small radius of curvature) peak or ridge of the feature. In a cross-sectional plane perpendicular to the feature axis 821-1, the features 821 have a concave curvature at the sides and a highly curved convex shape at the peak. This variable curvature may be defined by a Bezier function, as discussed further below. In addition to the precise nature of the surface curvature, the features 821 on the surface 822a may also be characterized by a height H and a pitch (feature-to-feature distance) P. The height H and/or pitch P may be uniform over the entire structured surface 822a, or either or both of them may change from feature-to-feature, or along a given feature, as discussed above in connection with FIGS. 6 and 7.

Figure 9:
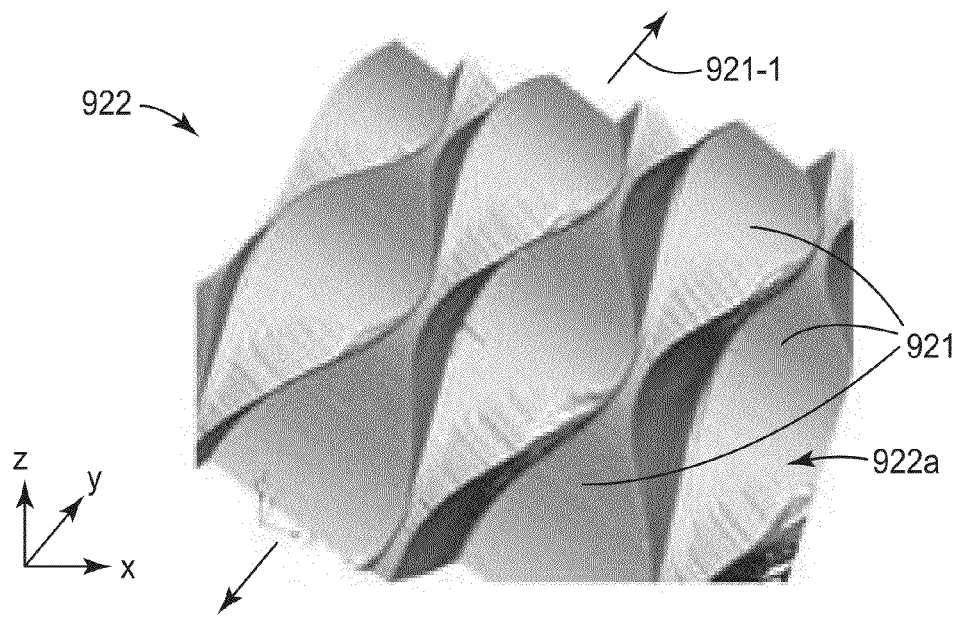
FIG. 9 is an enlarged schematic perspective view of a structured surface with elongated features that undulate in height and width along their length.

FIG. 9 shows an example of still another structured surface whose elongated features have curved surfaces. In FIG. 9, a film 922 has a structured major surface 922a opposite a flat or smooth major surface (not labeled). This film can be used in the construction of a light transmissive tube such that the structured surface 922a is used as an inner structured surface and/or an outer structured surface of the tube. The structured surface 922a has an array of distinct elongated features 921. The features 921 each extend parallel to a feature axis 921-1, which is parallel to the y-axis. The features 921 undulate in both height and width along their length. In a cross-sectional plane perpendicular to the feature axis 921-1, the features 921 may have a V- or inverted V-shape, the sides of which may be straight or curved.

Additionally, due to the undulating characteristic of the features, the side surfaces of the features 921 are curved in the plane of the film, i.e., in cross-sectional planes parallel to the x-y plane of FIG. 9. The curvature in such planes can be tailored by appropriate selection of the repeat distance (physical wavelength) of the longitudinal undulation, with a shorter repeat distance producing greater curvature in the x-y plane. Structured surfaces similar to that of FIG. 9 are disclosed in U.S. Pat. No. 7,695,180 (Schardt et al.), the entire disclosure of which is incorporated herein by reference.

Structured surfaces whose elongated features have a surface or surfaces that are substantially curved are of particular utility when it is important for the lighting system to have a spatially uniform appearance. This is because the curved surface(s) can redirect incident light (e.g. by refraction or reflection) over a broader range of output angles than a flat surface.

Curved surfaces that are of particular interest are those that can be characterized by a Bezier function, and in particular, a cubic Bezier function. Surfaces characterized by such functions are disclosed in Patent Application Publication US 2013/0258709 (Thompson et al.), the entire disclosure of which is incorporated herein by reference. Briefly summarized, a shape function such as the height profile of the cross-sectional shape of a prism, lens, or other feature, or more precisely the portion of that height profile from a point at or near the base to a point at or near the top or peak of the feature, can be converted by a scaling factor and simple translation to a scaled function that lies in a given plane (referred to here as an X,Y plane), the scaled function having a first endpoint ($X_0$, $Y_0$), e.g. associated with the top or peak, and a second endpoint ($X_3$, $Y_3$), e.g. associated with the base, and where the scaling and translation operations provide that $X_0=0$, $X_3=1$, and $Y_3=0$, then the height profile is characterized by a (cubic) Bezier function if the scaled, translated function satisfies the following set of parametric equations:

$$X(t)=a_x t^3+b_x t^2+c_x t+X_0$$

$$Y(t)=a_y t^3+b_y t^2+c_y t+Y_0$$

where t ranges from 0 to 1, and where $(X(0),Y(0))$ is the first endpoint $(X_0, Y_0)$, and where $(X(1),Y(1))$ is the second endpoint $(X_3, Y_3)$, and where $(X_1,Y_1)$ and $(X_2,Y_2)$ are "control points" that lie somewhere in the X,Y plane, and further where:

$$c_x=3(X_1-X_0),$$

$$b_x=3(X_2-X_1)-c_x,$$

$$a_x=X_3-X_0-c_x-b_x,$$

$$c_y=3(Y_1-Y_0),$$

$$b_y=3(Y_2-Y_1)-c_y, \text{ and}$$

$$a_y=Y_3-Y_0-c_y-b_y.$$

Furthermore, we can require the control point coordinate $Y_1$ to equal $Y_0$, in which case: $Y_0$ and $Y_1$ may be in a range from 0.75 to 2.25 (or in some cases from 0.75 to 1.25); $X_1$ may be in a range from 0.1 to 0.6; $X_2$ may be in a range from 0.1 to 0.6: and $Y_2$ may be in a range from 0.5 to 1.0.

The inner and outer structured surfaces of the lighting system may be embodied in one or more optical films or other components of the lighting system, including but not limited to optical bodies such as those shown schematically in FIGS. 6-9, and may be formed using any suitable technique. For example, a structured layer may be cast onto a carrier film or other substrate using a patterned drum or tool, and then cured. Alternatively, the structures and substrate may be made of a single material or layer in an extrusion replication process, e.g. as described in international application WO 2010/117569 (Bay et al.).

In one approach, two structured surfaces may be formed on opposed sides of a single carrier film or other substrate by a cast-and-cure process, e.g. using UV-curable formulations of selected refractive indices on both sides of the substrate, such that the surface features on the opposed sides of the substrate have the same or different shape, and such that they have the same or different refractive indices. In another approach, a two-sided replicated film (e.g., an optical film whose opposed major surfaces are structured surfaces containing elongated surface features as described herein) may be made using a single thermoplastic or curing material using extrusion replication against two structured rolls, or using compression molding or embossing, or by casting and curing between two structured tools or liner, e.g., a PDMS elastomer made via hydrosilylation reaction, Sylgard 184 from Dow Corning or elastomeric polyurethanes, or the like. In another approach, the two structured surfaces can be formed on separate carrier films or substrates, e.g. via a cast-and-cure process to make two distinct structured films each of which has only one structured surface. Such films may then be used in the following ways: they may be laminated together with a suitable adhesive (e.g., pressure sensitive or structural) to form a single film construction having two structured surfaces; the films may remain separate and unbounded (not attached to each other), and inserted into a tubular sleeve such that both of the structured films (an inner one with its structured surface facing inward, and an outer one with its structured surface facing outward) are pressed or held against the inner surface of the sleeve; or one structured film can be inserted and optionally attached to the inside of a tubular sleeve, with its structured surface facing inward, and the other structured film can be laminated to the outer surface of the sleeve, with its structured surface facing outward. In another approach, whether the two structured surfaces are formed on opposite sides of a single substrate or formed on separate substrates, the structured film or films can itself or themselves be wound or folded up to form a self-supporting tube. In winding or folding the film(s), the opposite edges of the film(s) may be attached to each other with no longitudinal translation (e.g. the reverse process of the unfolding depicted in FIG. 4), or a longitudinal translation may be used so that the film(s) itself/themselves curl in a spiral fashion. Some of these approaches are discussed further elsewhere herein.

The materials used in the structured optical films and bodies may be any suitable light-transmissive polymers or other materials. For films made by casting a curable resin onto a substrate, the substrates can comprise materials such as polyester, polycarbonate styrene-acrylonitrile, cellulose acetate butyrate, cellulose acetate propionate, cellulose triacetate, polyether sulfone, polymethyl methacrylate, polyurethane, polyvinyl chloride, polystyrene, polyethylene naphthalate, copolymers or blends based on naphthalene dicarboxylic acids, polycyclo-olefins, and polyimides. Optionally, the substrate material can contain mixtures or combinations of these materials. In some embodiments, the substrate may be multilayered or may contain a dispersed component suspended or dispersed in a continuous phase. Any suitable material or materials can be used to form the structured optical film. For example, the structures can be formed from organic or inorganic high index resins. In some embodiments, the structures can be formed from high index resins that include nanoparticles, such as the resins described in U.S. Pat. No. 7,547,476 (Jones et al.). In other embodiments, the structures can be formed from UV curable acrylic resins, e.g., those described in Patent Application Publication US 2009/0017256 A1 (Hunt et al.), and International Patent Publication WO 2010/074862 (Jones et al.).

Useful materials that may be used to form the structured optical films by either extrusion replication or an embossing process include, for example, thermoplastic materials such as styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, and polycyclo-olefins. Optionally, the material used to form the structures may include mixtures or combinations of these materials. In some embodiments, particularly useful materials include polymethyl methacrylate, polycarbonate, styrene methacrylate, and cycloolefin polymers (for example Zeonor and Zeonex available from ZEON Chemicals).

The structured optical films may also be formed from other suitable curing materials such as epoxies, polyurethanes, polydimethylsiloxanes, poly(phenyl methyl)siloxanes, and other silicone based materials, for example, silicone polyoxamides and silicone polyureas. The structured surface layer can also include a short wavelength absorber (e.g., UV light absorber).

In some cases, where two individual optical films are combined into a single film construction, adhesives can be used to bond the individual films together. In other cases the individual films may be laminated or affixed to a tubular support structure. For example, the structured surface layer can be attached to the inner and/or outer surface of the tubular support structure with an adhesive layer. In some embodiments, the adhesive layer is optically clear and colorless to provide optical coupling between the two structured surface layers and/or to the tubular support. Further, the adhesive layer may preferably be non-yellowing and resistant to heat and humidity, thermal shock, etc.

The adhesive layer can be formed using any suitable material or materials. In some embodiments, the adhesive layer may include any suitable repositionable adhesive or pressure-sensitive adhesive (PSA). Useful PSAs include those that meet the Dalquist criterion (as described in Handbook of Pressure Sensitive Adhesive Technology, Second Ed., D. Satas, ed., Van Nostrand Reinhold, N.Y., 1989.). The PSA can comprise various chemical compositions, many of which are described in Patent Application Publication US 2013/0258709A1 (Thompson et al.).

In some embodiments, the PSA includes an optically clear PSA having high light transmittance of from about 80 to about 100%, from about 90 to about 100%, from about 95 to about 100%, or from about 98 to about 100% over at least a portion of the visible light spectrum (about 400 to about 700 nm). In some embodiments, the PSA has a haze value of less than about 5%, less than about 3%, or less than about 1%. In some embodiments, the PSA has a haze value of from about 0.01 to less than about 5° %, from about 0.01 to less than about 3%, or from about 0.01 to less than about 1%. Haze values in transmission can be determined using a haze meter according to ASTM D1003.

In some embodiments, the PSA is or includes an optically clear adhesive having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%.

In some embodiments, the PSA is hazy and diffuses light, particularly visible light. A hazy PSA may have a haze value of greater than about 5%, greater than about 20%, or greater than about 50%. A hazy PSA may have a haze value of from about 5 to about 90%, from about 5 to about 50%, or from about 20 to about 50%. The haze that diffuses the light should in some preferred embodiments be primarily forward scattering, meaning that little light is scattered back toward the originating light source when the light is incident at an oblique angle.

The refractive indices of the structured surface films, adhesives, and other light-transmissive components in the lighting system may be selected based on the overall lighting system construction. The structured films and PSAs may have a refractive indices in the range of from about 1.3 to about 2.6, 1.4 to about 1.7, or from about 1.45 to about 1.7.

As discussed above, the disclosed lighting systems may include a light source assembly which injects light into the cavity formed by the light-transmissive tube. To accomplish this, the light source assembly comprises one or more individual light sources, typically solid state light sources such as LEDs. The LED(s) may emit white light or narrower band light such as red, green, or blue visible light, or light of another emission spectrum suitable for the intended application. Another characteristic of the light sources, which may have a significant impact on the uniformity and brightness of the light emitted from the tube, is the output distribution of the LED as expressed for example in terms of the angular width or degree of collimation of the output light. Some LEDs produce highly collimated output light, whereas other LEDs produce uncollimated, or even side-emitting output distributions. FIGS. 10A through 12B provide some schematic illustrations of some such representative light sources.

Figure 10A:
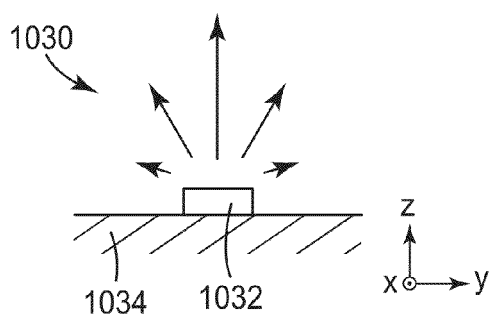
FIGS. 10A, 11A, and 12A are a schematic side or sectional views of various solid state LED light sources.
Figure 10B:
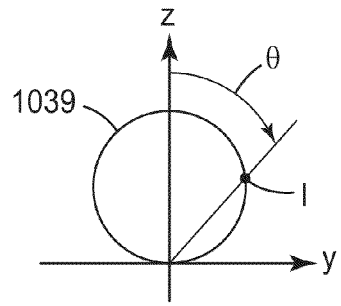
FIGS. 10B, 11B, and 12B are schematic depictions of their respective output distributions as a function of polar angle.

In FIG. 10A, an LED light source 1030 comprises an LED die 1032 attached to a base 1034. The source is shown in relation to a Cartesian x-y-z axis that may be the same as that of FIG. 1, where the z-axis is parallel to the longitudinal axis of the tube. The z-axis is also assumed for purposes of FIGS. 10A-12B to be parallel to an output axis or symmetry axis of the light source. In FIG. 10A, no encapsulant or other structure is provided to change the degree of collimation of the output light, or if an encapsulant (not shown in FIG. 10A) is provided, it may have a flat output surface parallel to the x-y plane. In either case the output light from the source 1030 may be Lambertian or substantially Lambertian. This is shown in FIG. 10B by the curve 1039 of light intensity versus polar angle θ for the source 1030, the polar angle being measured relative to the z-axis. One way of characterizing the degree of collimation is to measure the polar angle θ at which the intensity-versus-angle function drops to half of its maximum value.

Figure 11A:
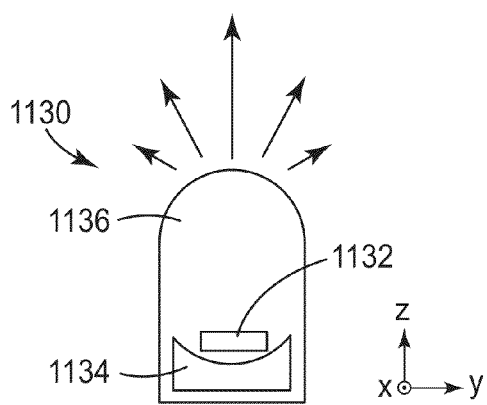
Figure 11B:
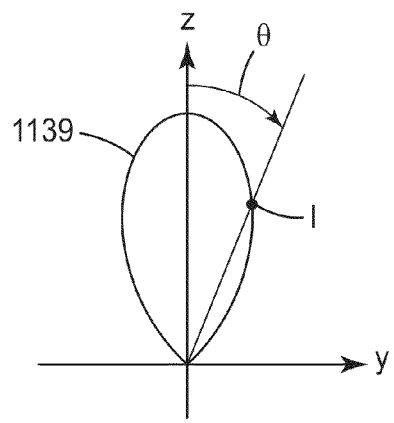

In FIG. 11A, another LED light source 1130 is shown. In the light source 1130, the LED die 1132 is mounted on a base 1134 that includes a concave reflector and a convex encapsulant 1136. These elements help to collimate the output light of the source 1130 relative to that of the light source 1030. The more collimated output is represented in FIG. 11B by the curve 1139 of light intensity versus polar angle θ for the source 1130. The angular width of this light output, as measured by the polar angle θ at which the intensity-versus-angle function drops to half maximum, is smaller than that of the source of FIG. 10A.

Figure 12A:
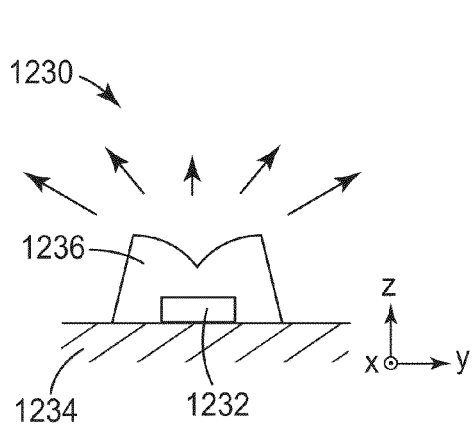
Figure 12B:
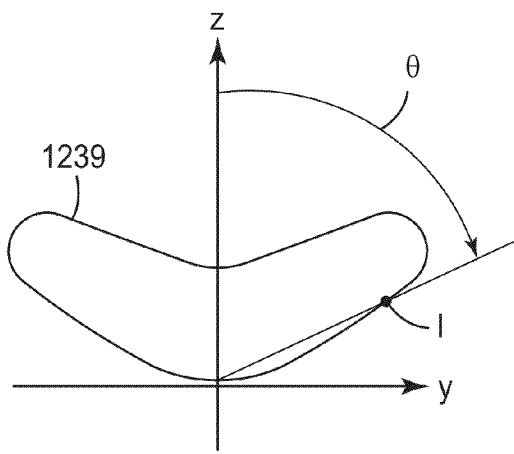

In FIG. 12A, another LED light source 1230 is shown. In the light source 1230, the LED die 1232 is mounted on a base 1234 and is immersed in an encapsulant 1236 that is shaped to preferentially direct light from the die 1232 along directions that are divergent from the symmetry axis of the component. The encapsulant 1236 thus de-collimates the output light of the source 1230 relative to that of the light source 1030, to produce a preferentially side-emitting LED. The less collimated output is represented in FIG. 12B by the curve 1239 of light intensity versus polar angle θ for the source 1230. The angular width of this light output, as measured by the polar angle θ at which the intensity-versus-angle function drops to half maximum (and where we require that this polar angle is greater than the polar angle of maximum intensity), is greater than that of the sources of FIGS. 10A and 11A.

Figure 13:
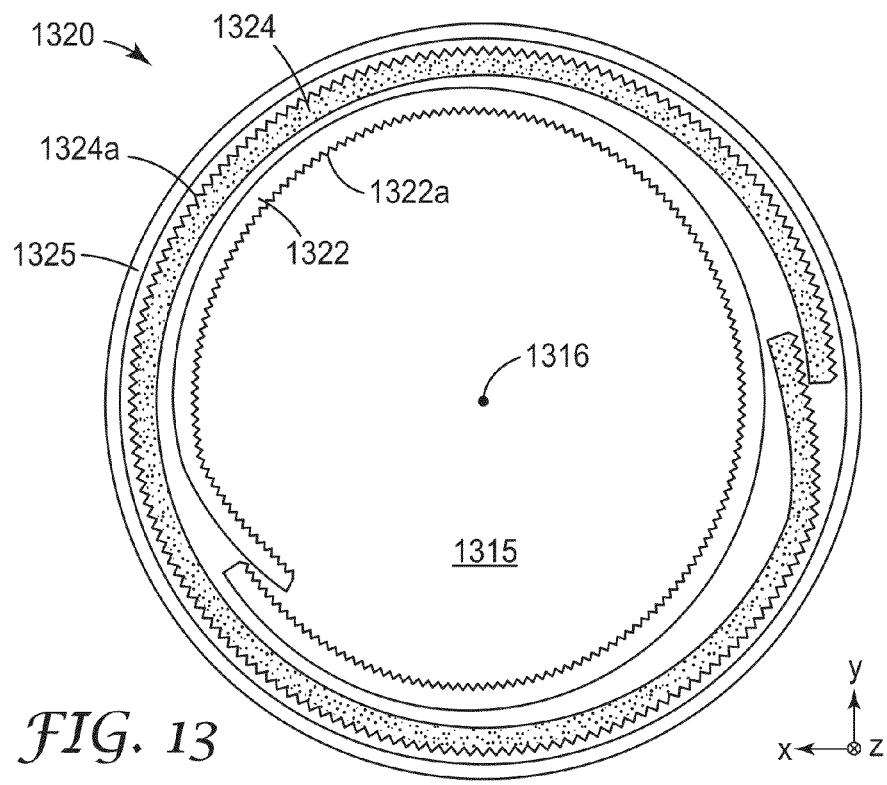
FIGS. 13 and 14 are schematic cross-sectional or end views of different tubes suitable for use in the disclosed lighting systems.

Another component of the disclosed lighting systems is the light-transmissive tube. The tube may be made in a variety of different shapes and sizes, and may have a variety of different component parts and construction configurations. Some of these configurations are shown in FIG. 13 and following. The schematic views of FIGS. 13 through 19 are down the longitudinal axis of the respective tubes.

In FIG. 13, a light-transmissive tube 1320 suitable for use in the disclosed lighting systems includes a sleeve member 1325 inside of which a structured optical film 1322 and a structured optical film 1324 are disposed. The film 1322 has a structured surface 1322a, and the film 1324 has a structured surface 1324a. The optical films 1322, 1324 may be held loosely or only by friction within the sleeve 1325, or they may be attached by an optically clear adhesive or another suitable mechanism. Each of the films 1322, 1324 is shown to be oversized in the sense that their transverse dimension is greater than the inner circumference of the sleeve 1325, such that one end of these films overlaps with its opposite end. In alternative embodiments one or both such films may be carefully sized such that they completely surround the inner circumference of the sleeve 1325 without overlapping themselves. In still other embodiments one or both such films may be undersized such that they surround or occupy only a portion of the tube circumference, such as shown below in FIGS. 20B and 22B. Note in this regard that the tube "circumference" should be broadly interpreted to encompass not only tubes with circular cross-sectional shapes but also those with non-circular, including e.g. polygonal, cross-sectional shapes. In still other embodiments one or both of the structured optical films may be attached to the outer surface of the sleeve 1325. For example, the smooth major surface of the structured film 1324 may be laminated to the outer surface of the sleeve 1325 such that its structured surface 1324a remains outward-facing and exposed to air, and the smooth major surface of the structured film 1322 may be laminated to the inner surface of the sleeve 1325 such that its structured surface 1322a remains inward-facing and exposed to air. In still other embodiments, the sleeve 1325 may be omitted and the films 1322, 1324 may be attached to themselves or to another reinforcing member to provide the light-transmissive tube.

However, referring again to FIG. 13, the tube 1320 includes the sleeve 1325 as well as the structured optical films 1322, 1324. The tube 1320 defines a cavity 1315 and a longitudinal axis 1316. The structured surface 1322a of film 1322 provides an inner structured surface that faces the cavity 1315. The structured surface 1324a of film 1324 provides an outer structured surface that faces away from the cavity 1315. The inner structured surface 1322a is configured to direct a first portion of light injected into the cavity 1315 by the light source assembly (not shown) towards the outer structured surface 1324a, and to direct a second portion of the injected light back into the cavity 1315. The inner structured surface 1322a has elongated first features and the outer structured surface 1324a has elongated second features, and at least one of the elongated first features and the elongated second features are oriented obliquely relative to the longitudinal axis 1316 such that they form respective helixes along the tube. The elongated first and second features are shown schematically as simple prismatic features in FIG. 13 for simplicity, but the reader will understand that other elongated structured surface features can also be used as discussed above.

The various components of the disclosed tubes are sufficiently light transmissive so that the inner and outer structured surfaces can cooperate to redirect light from the light source assembly outward from the emitting area of tube, keeping in mind that the emitting area may be the entire outer surface of the tube, or only a portion thereof. Thus, in some cases, some or all of the components of the tube 1320 may be made of substantially water-clear, low haze materials, such that little or no light diffusion or scattering occurs other than that associated with the structured surfaces of the structured optical films. In other cases, one, some, or all of the components of the tube may exhibit a controlled amount of light scattering, absorption, and/or reflection. Such optical characteristics may be introduced for utilitarian purposes, e.g. to enhance the spatial uniformity of the output light, or for aesthetic purposes, e.g. to provide a desired color or appearance to the output light. Some optical characteristics may provide both utilitarian and aesthetic benefits, such as in the case where the tube includes a reflective polarizing film. Such a film, whether used as a sleeve such as sleeve 1325 or as a carrier film or other component of one of the structured surface films, may both cause the light output to be polarized, which may serve utilitarian purposes in some applications, and give the lighting system a shiny metallic appearance when the system is turned off, for aesthetics. For example, scattering particles or other scattering agents may also be incorporated into one or more of the optical films, adhesives, or other components of the tube or lighting system.

Figure 14:
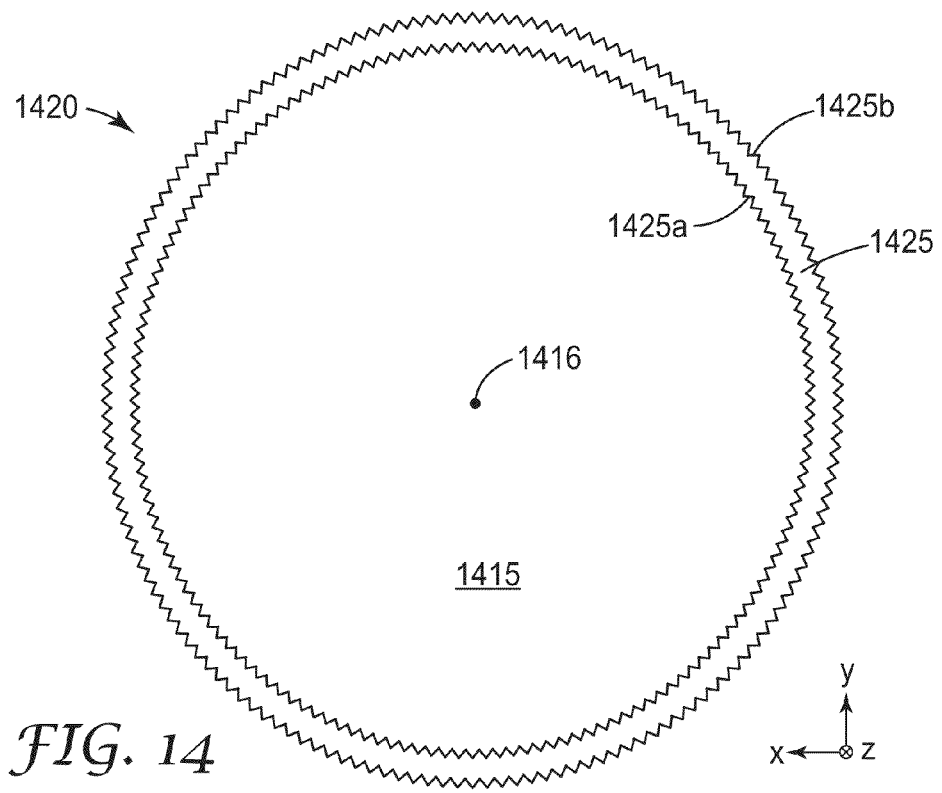

FIG. 14 shows another construction configuration of a light-transmissive tube. There, tube 1420 may be or include a single sleeve member 1425 whose inner surface 1425a and outer surface 1425b are both structured to include any of the elongated features described above. The tube 1420 defines a cavity 1415 and a longitudinal axis 1416. The inner structured surface 1425a faces the cavity 1415 and cooperates with the outer structured surface, which faces away from the cavity 1415, to redirect light from the light source assembly (not shown) outward from the emitting area of tube 1420. The inner structured surface 1425a has elongated first features and the outer structured surface 1424b has elongated second features, and at least one of these elongated feature sets are oriented obliquely relative to the longitudinal axis 1416 such that they form respective helixes along the tube 1420. The tube 1420 may be made by winding a single film having opposed structured surfaces, or a laminated pair of structured surface films, in on itself (e.g. the reverse process of the unfolding depicted in FIG. 4), and attaching the film edges along a seam (not shown). Other characteristics and features of the tube 1420, and of other light-transmissive tubes disclosed herein, including but not limited to the incorporation of scattering, absorption, and/or reflective agents or structures, can be incorporated into the tube 1420 or other aspects of the lighting system as appropriate.

Figure 15:
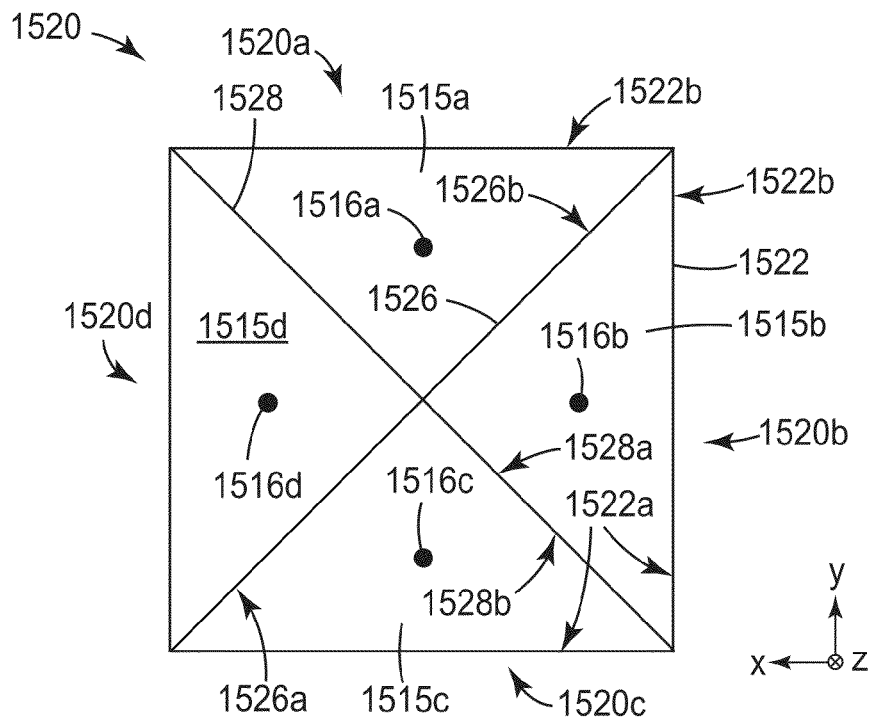
FIGS. 15 and 16 are schematic cross-sectional or end views of composite tubes, each composite tube comprising multiple individual light transmissive tubes whose longitudinal axes are parallel to each other, and each individual tube having at least one side that is light transmissive and at least one side that may be reflective and opaque.
Figure 16:
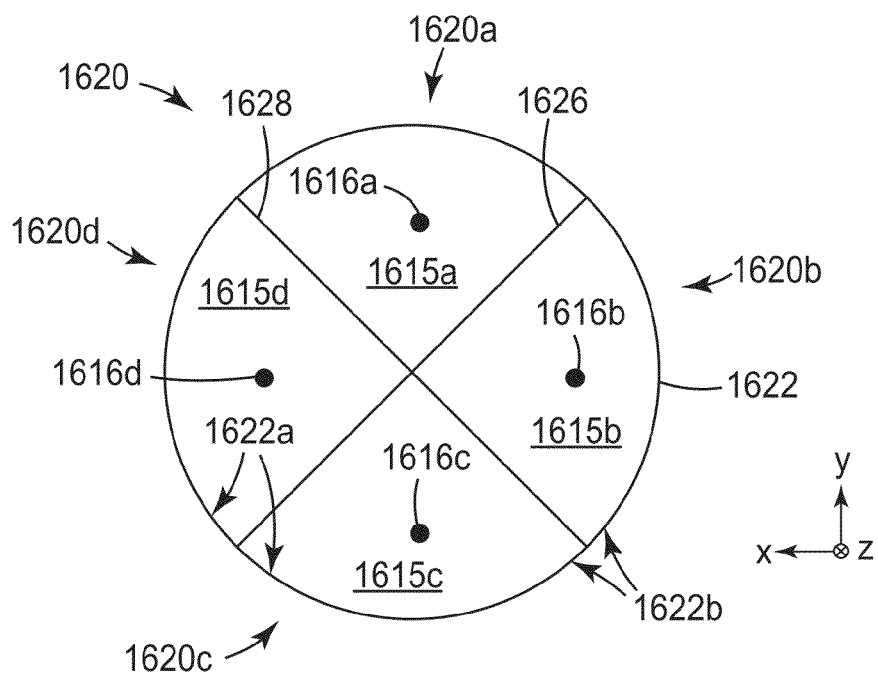

FIGS. 15 and 16 show still more light-transmissive tube construction configurations. The light-transmissive tubes of these figures can be considered to be composite tubes that include multiple individual light transmissive tubes whose longitudinal axes are parallel to each other, where each individual tube has at least one side that is light transmissive and at least one side that may be reflective and opaque.

Thus, for example, the light transmissive tube 1520 of FIG. 15 includes a structured film or structured film combination 1522 that defines a cavity and a longitudinal axis parallel to the z-axis. An inner structured surface 1522a of the film 1522 faces the cavity, and an outer structured surface 1522b faces away from the cavity. The inner and outer structured surfaces 1522a, 1522b include elongated features as discussed above to redirect light injected into the cavity outwardly from the emitting area of the tube, and at least some of the elongated features are obliquely oriented relative to the longitudinal axis. In this embodiment, the tube includes a crossed pair of divider walls 1526, 1528 which have the effect of subdividing the original cavity into a plurality of cavities 1515a, 1515b, 1515c, and 1515d, and the original tube into a plurality of light-transmissive tubes 1520a, 1520b, 1520c, 1520d. These cavities and tubes extend along respective longitudinal axes 1516a, 1516b, 1516c, and 1516d, which are parallel to each other and to the original cavity axis. In one embodiment, the walls 1526, 1528 may be or include highly reflective optical films or bodies, such as 3M™ Vikuiti™ Enhanced Specular Reflector (ESR) film. Alternatively, the walls 1526, 1528 may be or include a multilayer optical film that is tailored to be highly reflective over a more limited portion of the spectrum corresponding to the wavelength of the light injected into the cavities by the light source(s), and to be less reflective and more transmissive at other wavelengths. The high reflectivity provided by such walls 1526, 1528 may be at least 90% for the injected light at a design angle of incidence, such as a representative angle or angle at which the light source(s) inject light into the cavity. As such, the walls 1526, 1528 may be opaque or substantially opaque, e.g., they may have a transmission over the visible spectrum or at another wavelength range of interest of less than 20%, or less than 10%. The wall 1526 has opposed major surfaces 1526a, 1526b and the wall 1528 has opposed major surfaces 1528a, 1528b, and all of these major surfaces may be highly reflective so that little or none of the light injected into a proximal end of a given one of the cavities 1515a through 1515d is transmitted to a neighboring cavity. Alternatively, the walls 1526, 1528 may have lower reflectivities and higher transmission of the injected light to allow for a significant amount of light leakage between neighboring cavities. Separate light source assemblies can be provided for each of the tubes 1520a, 1520b, 1520c, 1520d, or a single light source assembly can be adapted to inject light into each such tube.

In the embodiment of FIG. 15, the inner structured surfaces of adjacent tubes, such as tubes 1520a and 1520b, may be different portions of a single inner structured surface 1522a. Furthermore, the outer structured surfaces of such adjacent tubes may also be different portions of a single outer structured surface 1522b. Opposed highly reflective surfaces of a wall, such as surfaces 1526a and 1526b of wall 1526, may form parts of neighboring tubes, such as tubes 1520a and 1520b, respectively.

The light-transmissive tube 1620 of FIG. 16 may be similar to the tube of FIG. 15, except that the tube of FIG. 16 forms a circular or curved cross-sectional shape rather than a polygonal shape. Thus, the light transmissive tube 1620 includes a structured film or structured film combination 1622 that defines a cavity and a longitudinal axis parallel to the z-axis, where an inner structured surface 1622a of the film 1622 faces the cavity, and an outer structured surface 1622b faces away from the cavity, and the inner and outer structured surfaces 1622a, 1622b include elongated features as discussed above to redirect light injected into the cavity outwardly from the emitting area of the tube, and at least some of the elongated features are obliquely oriented relative to the longitudinal axis. The tube 1620 also includes a crossed pair of divider walls 1626, 1628 which have the effect of subdividing the original cavity into a plurality of cavities 1615a, 1615b, 1615c, and 1615d, and the original tube into a plurality of light-transmissive tubes 1620a, 1620b, 1620c, 1620d. These cavities and tubes extend along respective longitudinal axes 1616a, 1616b, 1616c, and 1616d, which are parallel to each other and to the original cavity axis. The walls 1626, 1628 may be or include highly reflective optical films or bodies, as discussed above in connection with FIG. 15. The wall 1626 has opposed major surfaces 1626a, 1626b and the wall 1628 has opposed major surfaces 1628a, 1628b, and all of these major surfaces may be highly reflective, or may be less reflective, as discussed above in connection with FIG. 15. Separate light source assemblies or a single light source assembly can also be provided for the tubes 1620a, 1620b, 1620c, 1620d, as discussed above.

Figure 17:
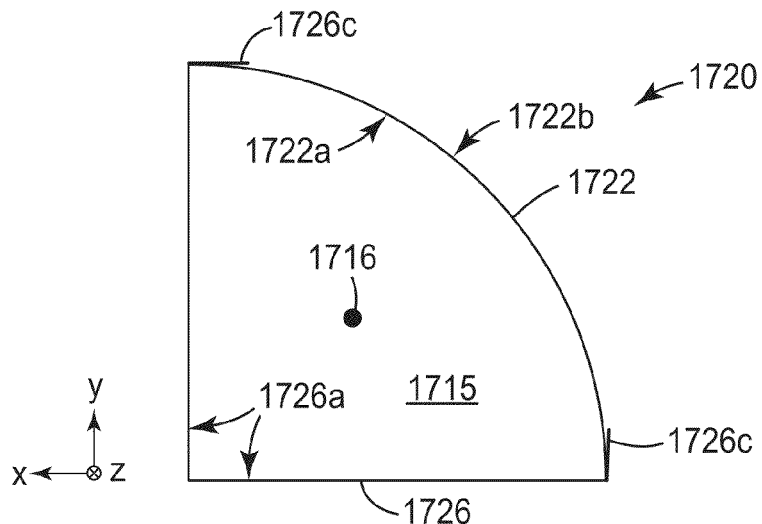
FIGS. 17-19 are schematic cross-sectional or end views of light transmissive tubes, each of which has at least one side that is light transmissive and at least one side that may be reflective and opaque.
Figure 18:
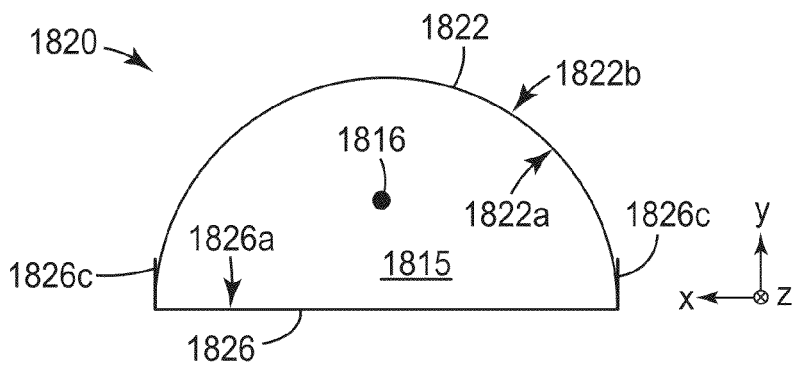
Figure 19:
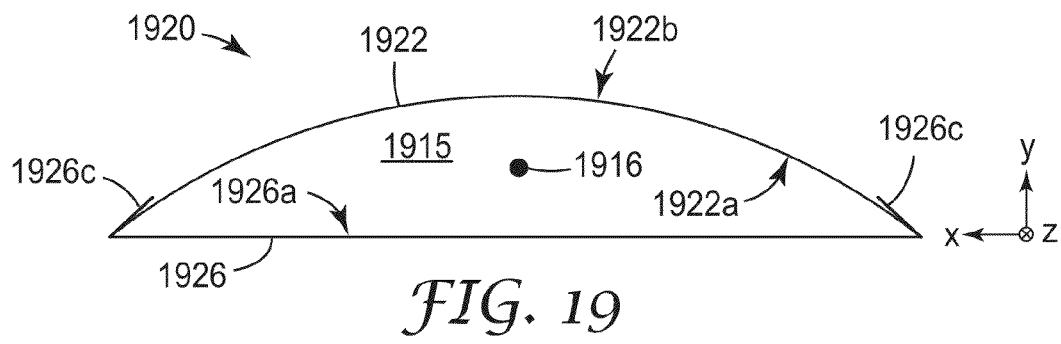

FIGS. 17 through 19 show still more light-transmissive tube construction configurations. In FIG. 17, a light-transmissive tube 1720 includes a wall 1726 to which a structured film or structured film combination 1722, such as those discussed elsewhere herein, is attached. The tube 1720 defines a cavity 1715 and a longitudinal axis 1716. The wall 1726 may be or include a highly reflective optical film or body, to promote light propagation down the tube and out of the structured film. The wall 1726 may thus include a surface 1726a that is highly reflective and substantially opaque. As such, the tube 1720 may in such cases emit light only from the structured film 1722. The wall 1726 is L-shaped and has terminal tabs 1726c to which the structured film 1722 can be attached.

In FIG. 18, a light-transmissive tube 1820 includes a wall 1826 to which a structured film or structured film combination 1822, such as those discussed elsewhere herein, is attached. The tube 1820 defines a cavity 1815 and a longitudinal axis 1816. The wall 1826 may be or include a highly reflective optical film or body, to promote light propagation down the tube and out of the structured film. The wall 1826 may thus include a surface 1826a that is highly reflective and substantially opaque. As such, the tube 1820 may in such cases emit light only from the structured film 1822. The wall 1826 is flat and has terminal tabs 1826c to which the structured film 1822 can be attached.

In FIG. 19, a light-transmissive tube 1920 includes a wall 1926 to which a structured film or structured film combination 1922, such as those discussed elsewhere herein, is attached. The tube 1920 defines a cavity 1915 and a longitudinal axis 1916. The wall 1926 may be or include a highly reflective optical film or body, to promote light propagation down the tube and out of the structured film. The wall 1926 may thus include a surface 1926a that is highly reflective and substantially opaque. As such, the tube 1920 may in such cases emit light only from the structured film 1922. The wall 1926 is flat and has terminal tabs 1926c to which the structured film 1922 can be attached.

Figure 20:
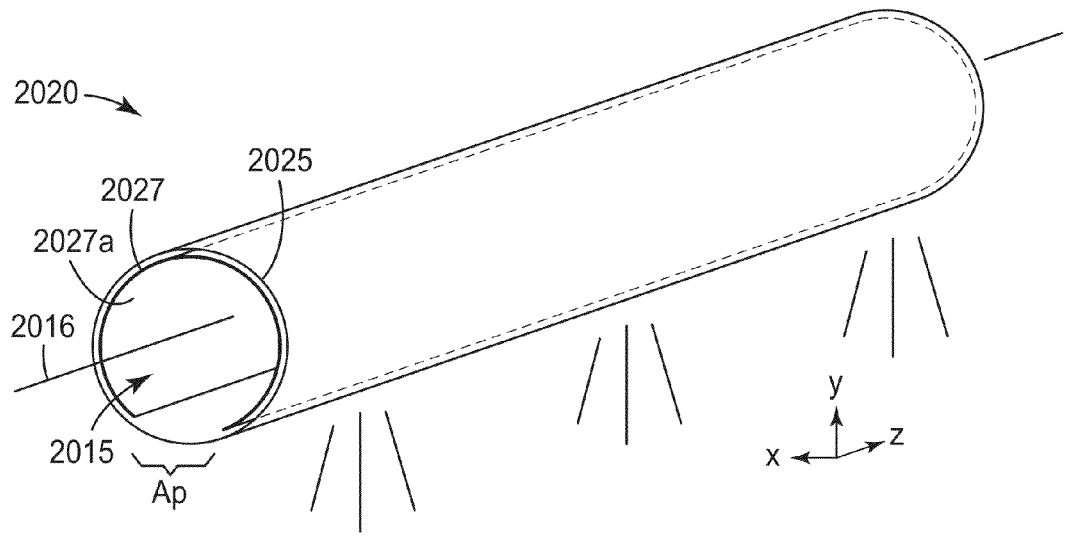
FIG. 20 is a schematic perspective view of a lighting system that includes a highly reflective optical film partially surrounding the cavity to define an elongated aperture for the lighting system.

Still more light-transmissive tube configurations are shown in FIG. 20 and following. The embodiments of FIGS. 20 and 22 (and related figures) show light-transmissive tubes that include one (FIG. 20) or more (FIG. 22) highly reflective optical films that define one (FIG. 20) or more (FIG. 22) elongated apertures of the respective lighting systems.

FIG. 20 depicts a lighting system in which a tube 2020 defines a cavity 2015 into which light is injected by a light source assembly (not shown). The tube 2020 also defines a longitudinal axis 2016. The tube 2020 includes a sleeve 2025, and a structured film or films (not shown in FIG. 20) that provide an inner structured surface with elongated features and an outer structured surface also with elongated features, configured and oriented as described herein. The tube also includes a highly reflective optical film 2027, e.g., a multi-layer optical film such as 3M™ Vikuiti™ Enhanced Specular Reflector (ESR) film, or another suitable optical film whose reflectivity is at least 90% for visible light, or for another wavelength range of interest or for the injected light at a design angle of incidence. Similar to the reflective walls discussed above, the highly reflective optical film may be opaque or substantially opaque, e.g., it may have a transmission over the visible spectrum or at another wavelength range of interest of less than 20%, or less than 10%. The reflective film 2027 has an inner major surface 2027a which faces the cavity 2015 and provides the high reflectivity to promote light propagation down the tube. Significantly, the reflective film 2027 is sized so that it only partially surrounds the cavity, to provide an elongated aperture AP for the lighting system. The structured surface film(s) are disposed at least in the aperture AP, and in some embodiments are also disposed at other locations around the circumference of the tube.

Figure 20A:
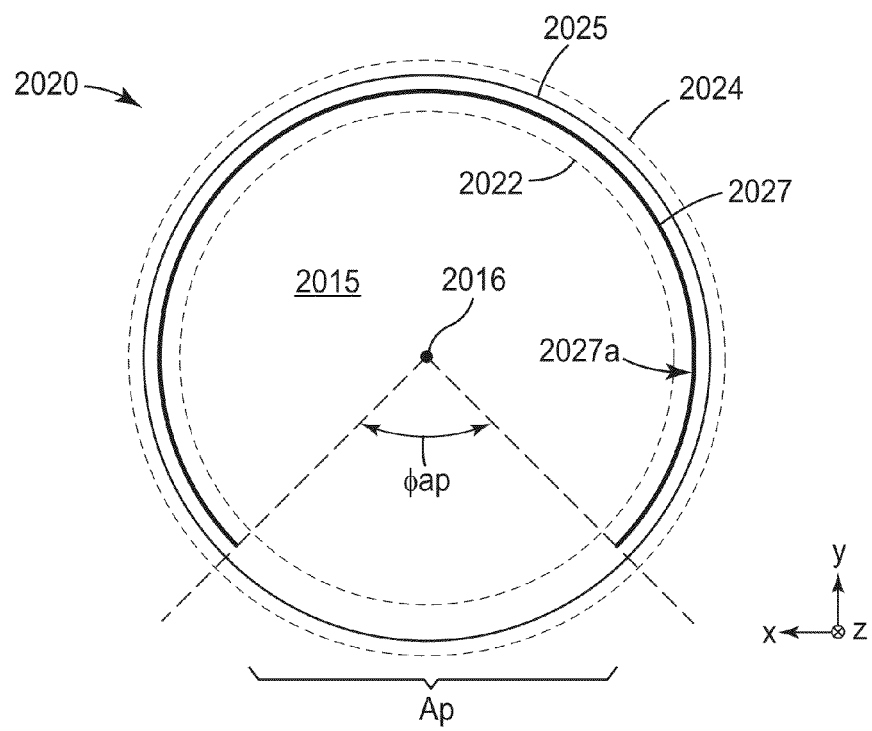
FIG. 20A is a schematic cross-sectional or end view of this lighting system.

FIG. 20A is a view down the longitudinal axis 2016 of the tube 2020. The sleeve 2025, the cavity 2015, the highly reflective film 2027, and the aperture AP, are carried over from FIG. 20 and need no further explanation. The aperture AP is shown to subtend an azimuthal angle $\phi_{ap}$. The structured surface film(s) may be provided in a number of different configurations. In one configuration, a structured optical film having the inward-facing structured surface can be provided at 2022 and a separate structured optical film having the outward-facing structured surface can be provided at 2024 as shown, where both such films wrap entirely around the circumference of the tube. As such, the highly reflective film 2027 and the sleeve 2025 are sandwiched between the structured optical films. Alternatively, the sleeve 2025 can be omitted, such that the highly reflective film 2027 is sandwiched directly between the structured optical films. A tube of this type may be made by taking a piece of the highly reflective film 2027 that is smaller than a piece of one of the structured optical films, and laminating or otherwise attaching the piece of highly reflective film to a major surface (e.g. the smooth major surface) of the structured optical film so that the highly reflective film attaches to the structured optical film over substantially an entire major surface of the highly reflective optical film. The other structured optical film may be similarly attached on the opposite side of the highly reflective film, and the film combination may then be rolled or folded up to form the aperture tube. (Note that attachment of structured optical films to other films or bodies, whether in this embodiment or other disclosed embodiments, may be made at a smooth major surface of the structured optical film so as to preserve the air/polymer interface at the structured surface, or attachment can instead be made at the structured surface of the structured optical film if a sufficiently low refractive index adhesive, e.g. an ultra low index (ULI) adhesive, is used.) Alternatively, the inner and outer structured surfaces may be provided on a single film or film combination, which may then be provided either interior to the highly reflective film 2027 (see 2022) or exterior to such highly reflective film 2027 (see 2024).

Figure 20B:
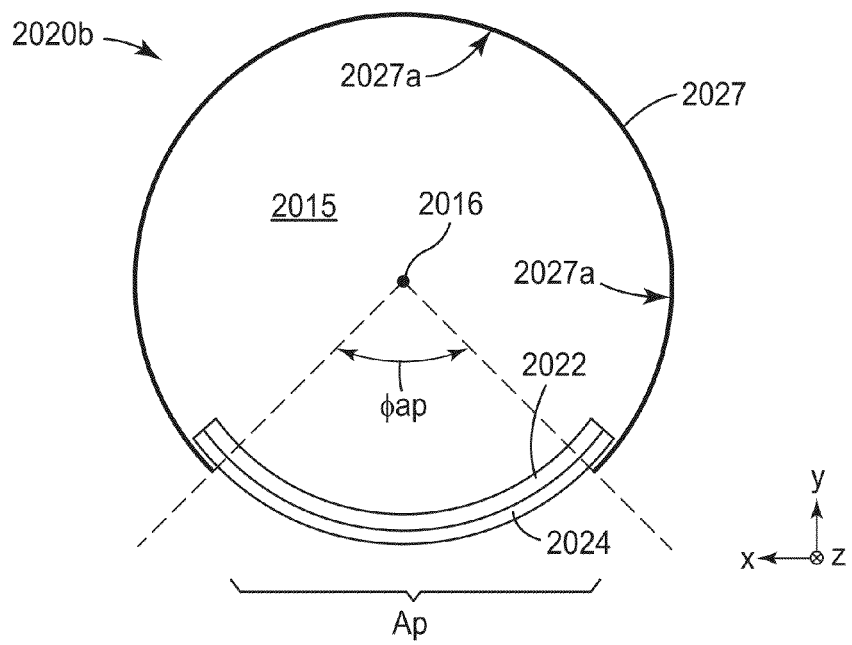
FIG. 20B is a schematic cross-sectional or end view of a lighting system having a highly reflective film to define an elongated aperture similar to FIGS. 20 and 20A, but using a different construction arrangement.
Figure 20C:
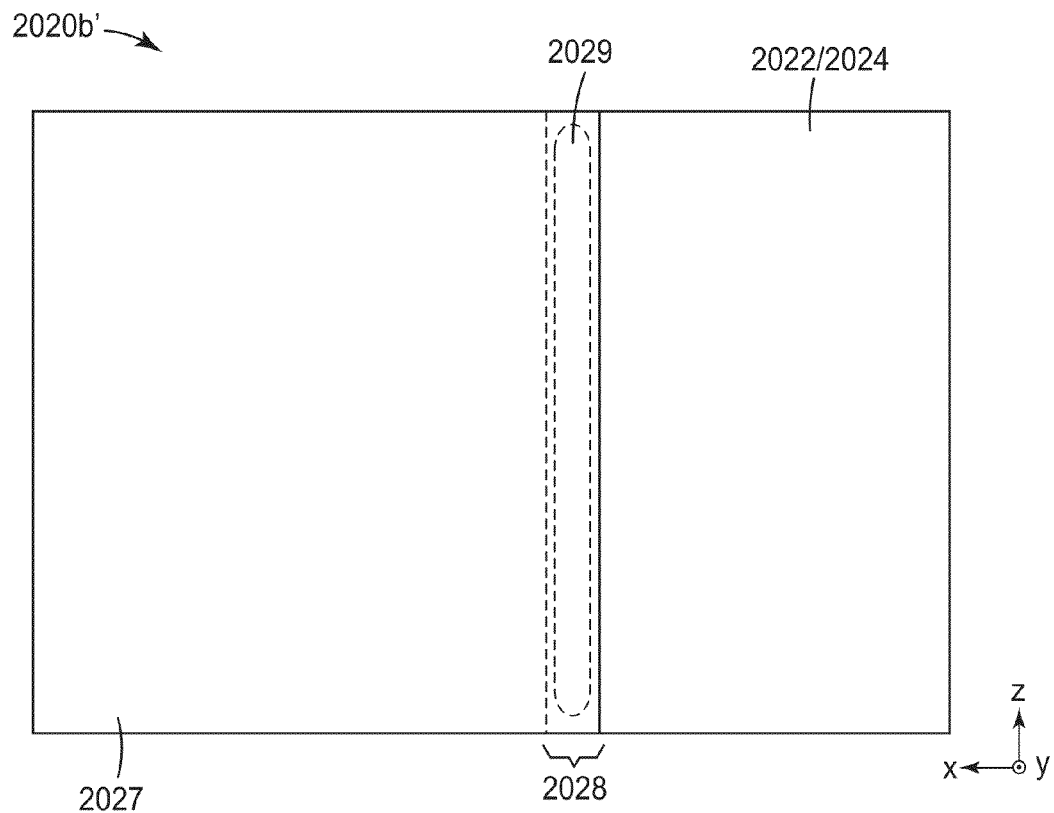
FIG. 20C is a schematic plan view of a flattened tube corresponding to the tube of FIG. 20B, the component films being in the form of strips attached to each other along a region of partial overlap.
Figure 20D:
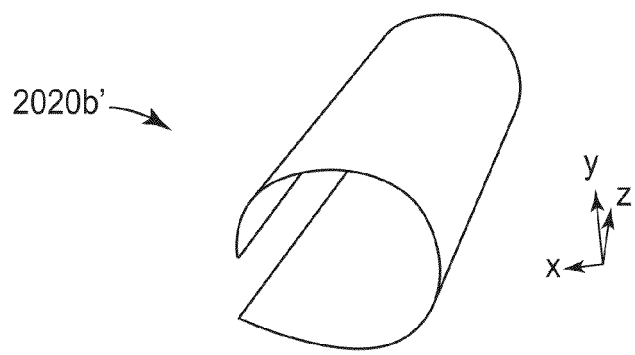
FIG. 20D is a schematic perspective view illustrating how the flattened tube of FIG. 20C can be rolled up to form a tube.

FIG. 20B shows an alternative embodiment in which smaller pieces of the structured optical films are used, which reduces waste and reduces material costs. Thus, the tube 2020b of FIG. 20B may be similar to tube 2020 shown in FIG. 20A, with like reference numbers referring to like elements, except that small pieces of a structured optical film 2022 having an inner structured surface and structured optical film 2024 having an outer structured surface are used. The smaller pieces only partially surround the cavity 2015, and partially overlap with the highly reflective film 2027 to allow attachment thereto. By breaking the attachment on one side and unrolling the films, a flattened tube 2020b', shown in FIG. 20C, is produced. In this embodiment, 2028 refers to one of the regions of partial overlap of the reflective film with the structured optical film combination 2022/2024. Attachment can be made in this region e.g. using a suitable adhesive 2029. The combination of FIG. 20C provides a first strip of at least one structured optical film, the first highly reflective optical film being a second strip, the first and second strips partially overlapping to define an overlap region and attached to each other along the overlap region. The flattened tube 2020b' may then be rolled up in the form of a tube, as shown schematically in FIG. 20D. The reader will appreciate that, in this and other embodiment, the films may be rolled or folded up with no twisting as shown in FIG. 20D or (the reverse process of) FIG. 4, or they may instead be rolled or folded up with twisting or shifting of the opposed vertical edges along the z-direction, such that the relative orientation of the elongated structured with respect to the longitudinal axis of the tube can be tailored as desired without having to change the structured surface tooling in a structured film line. An example of such twisting can be appreciated in the manufacture of conventional cardboard tubes.

Figure 21A:
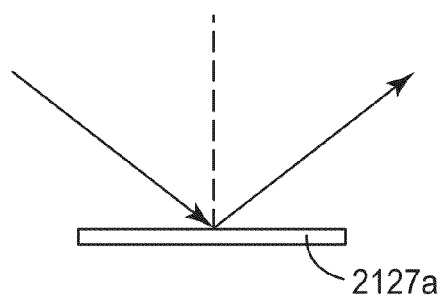
FIGS. 21A, 21B, and 21C are schematic side views of reflective films that respectively depict specular reflection, diffuse reflection, and semi-specular reflection.
Figure 21B:
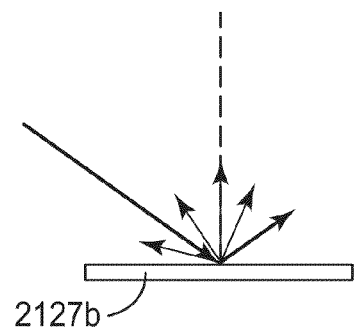
Figure 21C:
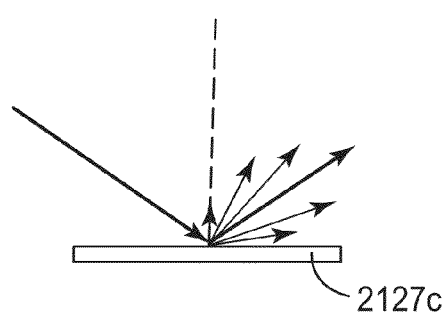

FIGS. 21A, 21B, and 21C are schematic side views of reflective films that respectively depict specular reflection, diffuse reflection, and semi-specular reflection. The reflective and highly reflective surfaces and films used in the disclosed lighting systems may assume any of these characteristics as needed. Such reflectors can be used in two primary ways. The first use is as an endcap on the distal end of the tube opposite of the light source as shown in FIG. 1A, element 118. The second use for reflectors in the lighting systems of the present case is to cover a portion of the length of the tube to promote additional transport of light in the tube and to provide for directional control of where the light is directed by creating defined apertures where the light can exit the lighting tube, e.g. as shown in FIG. 20B. The nature of the reflector can significantly affect how the light responds in the system and the choice of reflector based on it use and application.

A pure specular reflector, sometimes referred to as a mirror, performs according to the optical rule that "the angle of incidence equals the angle of reflection." This is seen in FIG. 21A, where a single light ray incident on reflector 2127a results in a single reflected ray with a complimentary angle of reflection. This type of reflector used in a tubular lighting system provides maximum lateral transport of the light down the length of a tube, since the collimated light remains collimated as it travels down the tube experiencing reflections off of the specular reflective surface, i.e., no angular mixing occurs based on interactions with the specular reflector, since there is no mechanism to convert light propagating at a given incidence angle to other incidence angles. A specular endcap will accept light that travels to the end of the tube and if the cap is flat will direct it back down the tube toward the light source from which it came. If angular spreading is desired, the spectrally reflective endcap can be shaped so as to provide for modification and spreading of the rays through reflection off of a non-planar surface.

A purely Lambertian reflector, on the other hand, redirects light rays equally in all directions as is shown in FIG. 21B. The same initially launched oblique light ray is immediately scattered off of Lambertian (diffuse) reflector 2127b and is scattered in all directions. Some of the reflected light travels "forward" (generally to the right as seen in the figure), but an equal amount travels "backward" (generally to the left). By forward scattering, we refer to the lateral or in-plane (in a plane parallel to the scattering surface in question) propagation components of the reflected light. When repeated, this process greatly diminishes the forward directed component of a light ray after several reflections. The beam is rapidly dispersed, producing minimal lateral transport. When used as an endcap reflector this diffuse reflection causes rapid spreading of the rays and emission of light from the tube.

A semi-specular reflector provides a balance of specular and diffusive properties. In the hollow cavity this can be advantageous to control the amount the level of propagation of the light by selective controlled spreading. The reflected portion of the same initially launched oblique light ray strikes the reflector 2127c in FIG. 21C, and is substantially forward-scattered in a controlled amount. The reflected cone of light is diffused but primarily in a "forward" direction. Semi-specular reflectors can thus be seen to promote the controlled levels of spreading of light in a reflective cavity, which can enhance adequate mixing of light ray directions to enhance uniformity, while still allowing for light propagation down the tube axis. Reflectors that are partially diffuse but that have a substantially forward directed component will transport more light across a greater distance with fewer total reflections of the light rays. We may describe a semi-specular reflector as one that provides substantially more forward scattering than reverse scattering.

Figure 22:
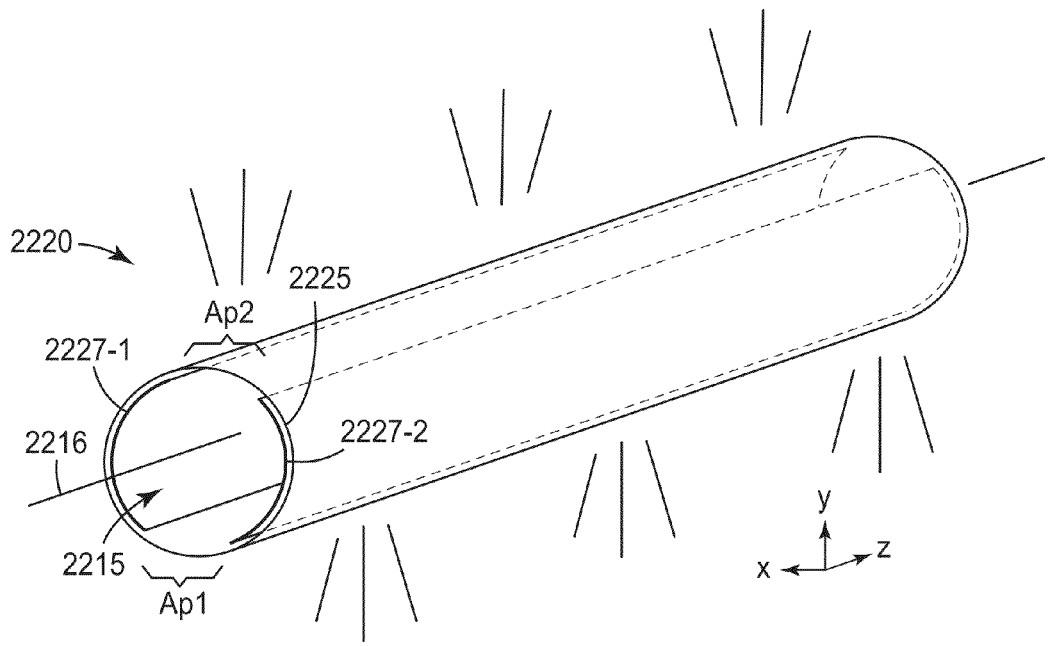
FIG. 22 is a schematic perspective view of a lighting system that includes two highly reflective optical films partially surrounding the cavity to define two elongated apertures for the lighting system.

FIG. 22 shows a lighting system having a light-transmissive tube 2220 similar to that of FIG. 20, except that two pieces of highly reflective film are used to form two elongated apertures. Thus, FIG. 22 depicts a lighting system in which a tube 2220 defines a cavity 2215 into which light is injected by a light source assembly (not shown). The tube 2220 also defines a longitudinal axis 2216. The tube 2220 includes a sleeve 2225, and a structured film or films (not shown in FIG. 22) that provide an inner structured surface with elongated features and an outer structured surface also with elongated features, configured and oriented as described herein. The tube also includes two highly reflective optical films 2227-1, 2227-2, which are similar to the film 2027 of FIG. 20. The reflective films 2227-1, 2227-2 have an inner major surfaces which face the cavity 2215 and provide the high reflectivity to promote light propagation down the tube. The reflective films 2227-1, 2227-2 are both sized so that they only partially surrounds the cavity, and separated from each other, to provide two elongated apertures AP1, AP2 for the lighting system. The structured surface film(s) are disposed at least in these apertures, and in some embodiments are also disposed at other locations around the circumference of the tube.

Figure 22A:
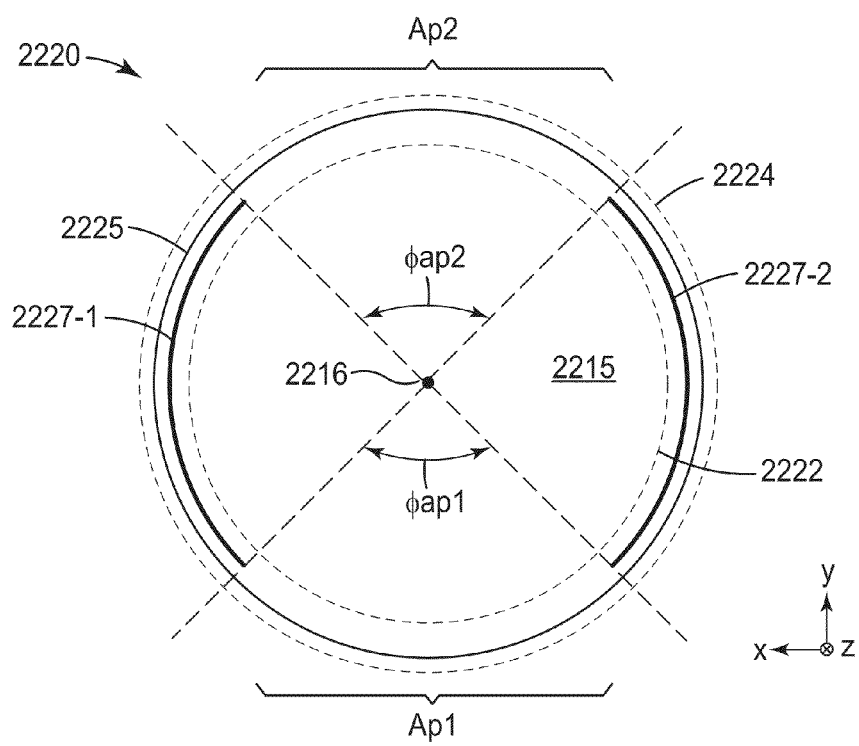
FIG. 22A is a schematic cross-sectional or end view of this lighting system.

FIG. 22A is a view down the longitudinal axis 2216 of the tube 2220. The sleeve 2225, the cavity 2215, the highly reflective films 2227-1 and 2227-2, and the apertures AP1 and AP2, are carried over from FIG. 22 and need no further explanation. The apertures are shown to subtend a azimuthal angles $\phi$ap1, $\phi$ap2 respectively. The structured surface film(s) may be provided in a number of different configurations. In one configuration, a structured optical film having the inward-facing structured surface can be provided at 2222 and a separate structured optical film having the outward-facing structured surface can be provided at 2224 as shown, where both such films wrap entirely around the circumference of the tube. As such, the highly reflective films and the sleeve 2225 are sandwiched between the structured optical films. Alternatively, the sleeve 2225 can be omitted, such that the highly reflective films 2227-1, 2227-2 are sandwiched directly between the structured optical films. A tube of this type may be made by taking pieces of the highly reflective film that are smaller than a piece of one of the structured optical films, and laminating or otherwise attaching the pieces of highly reflective film to a major surface (e.g. the smooth major surface) of the structured optical film so that the highly reflective films attach to the structured optical film over substantially their entire major surfaces. The other structured optical film may be similarly attached on the opposite side of highly reflective films, and the film combination may then be rolled or folded up to form the aperture tube. Alternatively, the inner and outer structured surfaces may be provided on a single film or film combination, which may then be provided either interior to the highly reflective films or exterior to such highly reflective films.

Figure 22B:
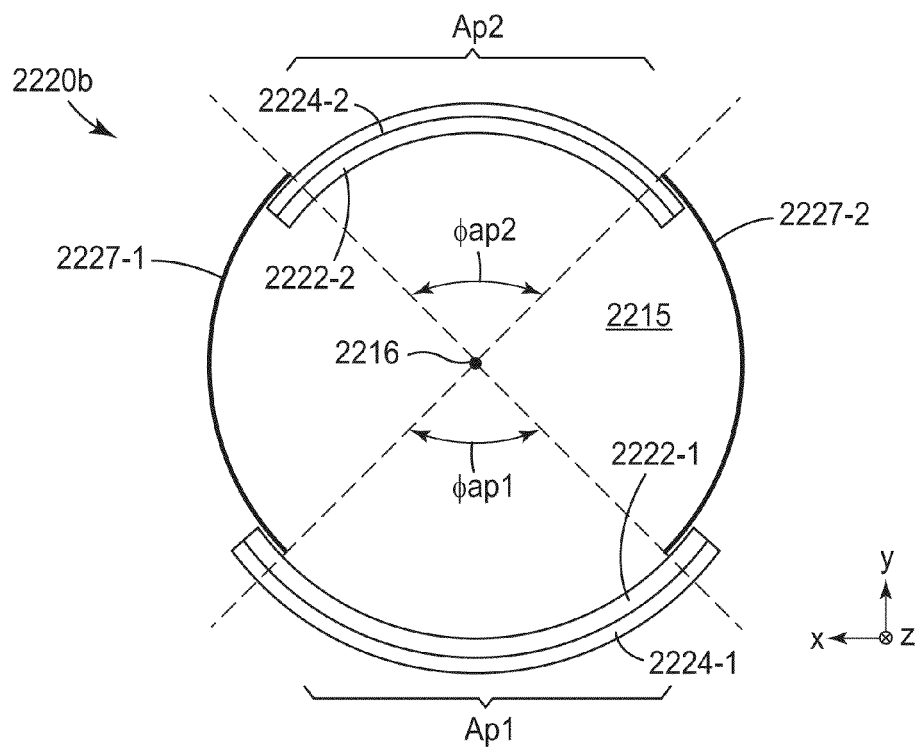
FIG. 22B is a schematic cross-sectional or end view of a lighting system having two highly reflective films to define two elongated apertures similar to FIGS. 22 and 22A, but using a different construction arrangement.
Figure 22C:
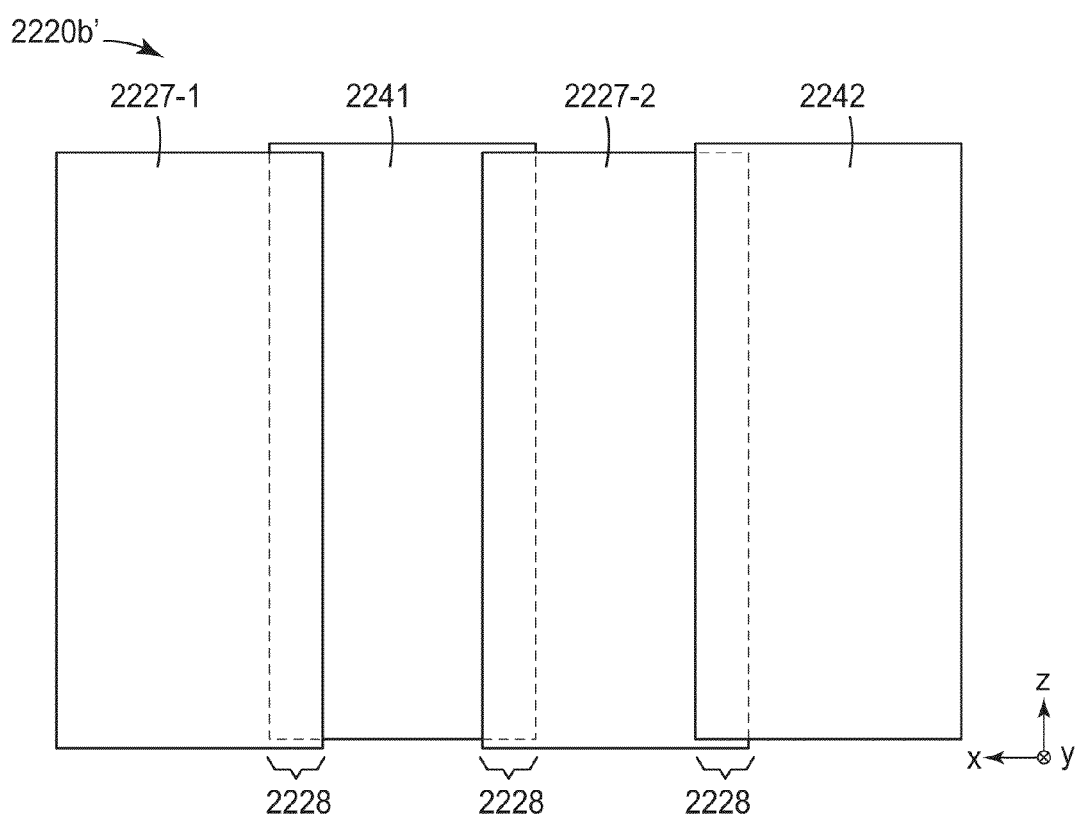
FIG. 22C is a schematic plan view of a flattened tube corresponding to the tube of FIG. 22B, the component films being in the form of strips attached to each other along regions of partial overlap.

FIG. 22B shows an alternative embodiment in which smaller pieces of the structured optical films are used, which reduces waste and reduces material costs. Thus, the tube 2220b of FIG. 22B may be similar to tube 2220 shown in FIG. 22A, with like reference numbers referring to like elements, except that small pieces of structured optical films 2222-1, 2222-2 having an inner structured surface, and structured optical films 2224-1, 2224-2 having an outer structured surface are used. The smaller pieces only partially surround the cavity 2215, and partially overlap with the highly reflective films to allow attachment thereto. By breaking the attachment on one side and unrolling the films, a flattened tube 2220b', shown in FIG. 22C, is produced. In this embodiment, 2228 refer regions of partial overlap of the reflective film with the structured optical film combination. Attachment can be made in this region e.g. using a suitable adhesive. The combination of FIG. 22C provides a first strip of at least one structured optical film, and a second strip of highly reflective optical film, the first and second strips partially overlapping to define an overlap region and attached to each other along the overlap region. The flattened tube 2220b' may then be rolled up as discussed elsewhere herein.

EXAMPLES

The foregoing principles were used to fabricate several lighting systems having one or more of the features and characteristics discussed above.

Materials Used to Make Lighting Systems Shown in FIGS. 23 to 29:

Microreplication Tools:

Microreplication tools were used to fabricate the microstructured optical films used in the following examples. The tools were made using two methods. The first commonly known method used was diamond turning. The second technique used in described in U.S. Patent Publication No. 2005/0024754 A1 (Epstein et al.). Metallic cylindrical tool patterns were cut in to the copper surface of the tool using either a precision diamond turning or engraving machine. The resulting copper cylinders with precision-cut features was nickel plated and treated for release using processes as described in U.S. Pat. No. 5,183,597 (Lu).

Turning Film:

A film having linear prisms, similar in nature to that shown in FIG. 6, was made using a metallic cylindrical tool pattern where the prism had a symmetric triangular cross section where the apex of the prism had an included angle of 70 degrees and the array of linear prism had a pitch of 50 microns. The structured surface layer was made using an acrylate resin including acrylate monomers and a photoinitiator that was cast onto a primed PET support film (5 mil in thickness) and was then cured against the precision cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SRK3339) with a photoinitiator package composed of 0.25% by weight of Darocur 1173 and 0.1% by weight Darocur TPO (both available from Ciba Specialty Chemicals Inc.). The resin when cured provides a solid polymeric material with a refractive index of 1.57.

Aspheric Lenticular Film:

A film having linear aspheric prisms, similar in shape to that shown in FIG. 7, was made using a metalliccylindrical tool pattern where the shape was made using the diamond shown in FIG. 20A of U.S. Patent Publication 2013/258709. The structured surface layer was made by using an acrylate resin including acrylate monomers and a photoinitiator that was cast onto a primed PET support film (2 mil in thickness) and was then cured against the precision cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SR3339) with a photoinitiator package composed of 0.25% by weight of Darocur 1173 and 0.1% by weight Darocur TPO (both available from Ciba Specialty Chemicals Inc.). The resin when cured provides a solid polymeric material with a refractive index of 1.57.

2-D Structured Film:

A film (see FIG. 9) was made that had a surface comprising an array of elongate continuous prisms occupying an x-y plane thereof, wherein each prism in the array comprises two inclined surfaces that meet to form a ridge, and wherein the ridges are substantially continuous and undulate in the x-y plane, wherein the ridges lie outside an x-z plane normal to the x-y plane, and further wherein the width of the prisms curvature in the x-y and x-z planes undulates along the y-direction and the height of the prisms undulates along a z-direction normal to the x-y plane. The structured surface layer was made by using an acrylate resin including acrylate monomers and a photoinitiator that was cast onto a primed PET support film (5 mil in thickness) and was then cured against the precision cylindrical tool using ultraviolet light to form a cured resin layer, the resin having a refractive index of about 1.586. The light extraction film is described in FIGS. 7a-e of U.S. Pat. No. 7,695,180. The film had a nominal overall thickness of about 6 mils. The features in each prism on the structured surface had a characteristic length $\lambda$ (see FIG. 7e of U.S. Pat. No. 7,695,180) of approximately 150 µm, a maximum and minimum width Wmax, Wmin of approximately 68 µm and 4 µm respectively, and a maximum and minimum height Hmax, Hmin of about 25 µm and 1 µm respectively. The inclined prism surfaces of each prism were substantially flat in transverse cross-section (see the y-z plane of FIG. 7d of U.S. Pat. No. 7,695,180) and formed an apex angle therebetween of approximately 96 degrees. The prisms had a structural asymmetry as depicted in FIGS. 7b-e of the '180 patent, where the cant angle $\theta$ was approximately 19 degrees.

Crossed Linear Aspheric Prism Film Having Linear Aspeheric Prisms on Two Sides of the Same Substrate:

A two side replicated film was made where the two sides of the film had mutually orthogonal linear aspheric prisms, similar in shape to those shown in FIG. 7, disposed on opposite sides of the same substrate. A metallic cylindrical tool pattern where the shape was made using a diamond similar to that shown in FIG. 20A of U.S. Patent Publication 2013/258709 where the linear prism had an orientation angle on the cylindrical tool of 45 degrees. The structured surface layer on the first side of the substrate was made by using an acrylate resin including acrylate monomers and a photoinitiator that was cast onto a primed PET support film (5 mil in thickness) and was then cured against the precision cylindrical tool using ultraviolet light. The resin was a 75/25 mixture by weight of CN120 (an epoxy acrylate oligomer available from Sartomer Company, Exton, Pa.) and Phenoxyethyl acrylate (available from Sartomer under the name SR3339) with a photoinitiator package composed of 0.25% by weight of Darocur 1173 and 0.1% by weight Darocur TPO (both available from Ciba Specialty Chemicals Inc.). The resin when cured provides a solid polymeric material with a refractive index of 1.57. Using the same metallic cylindrical tool a second linear set of linear aspheric prisms were made on the opposite side of the 5 mil PET substrate. The two sets of linear aspheric prisms on opposites sides of the same substrate have an orientation where the two sets of prisms are mutually orthogonal as shown in FIG. 5C, having an included angle between the prisms of 90 degrees.

Lighting System Examples

Example 1

FIG. 23 A-E

Figures 23A, 23B, 23C, 23D, 23E:
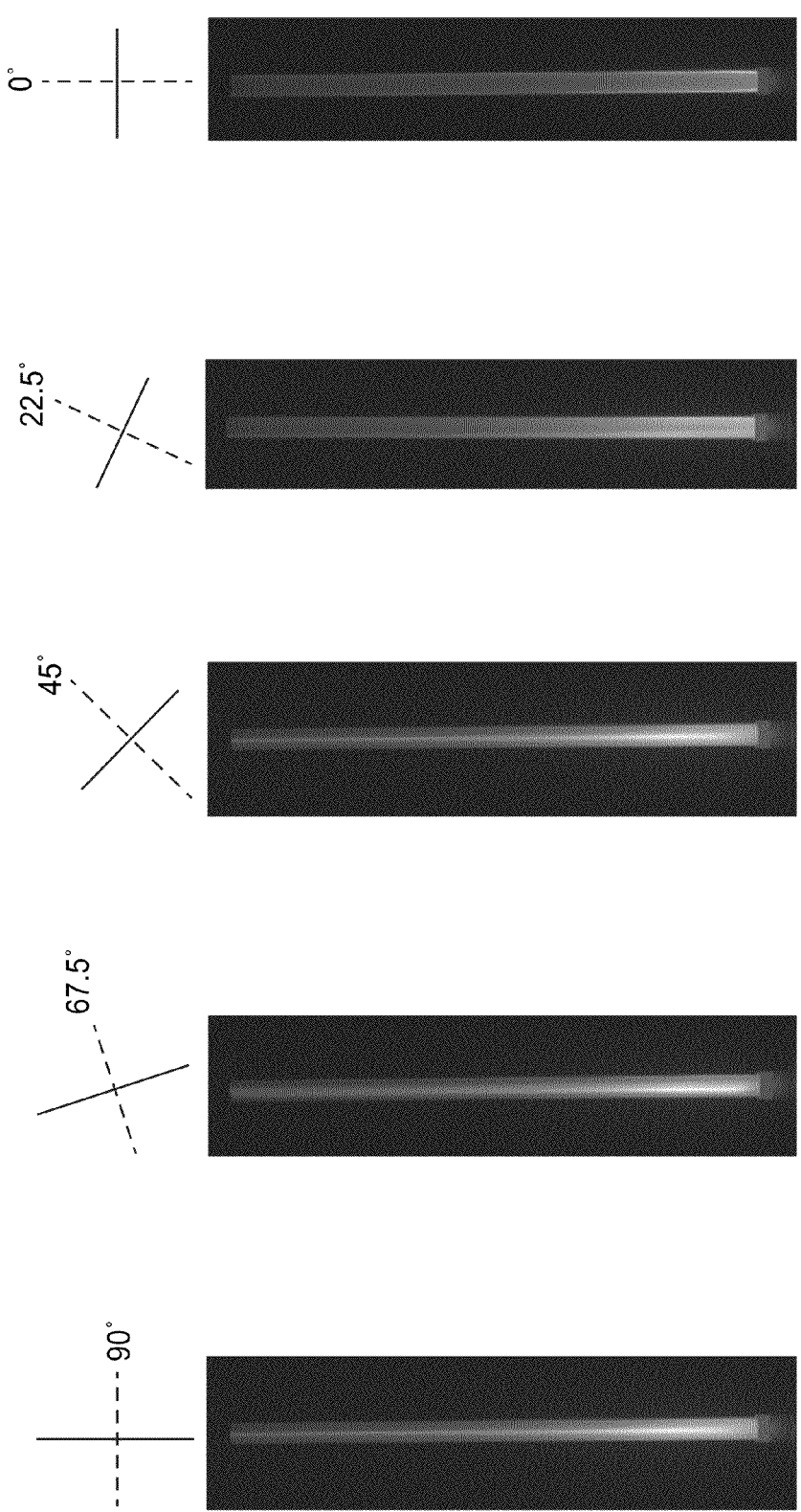
FIGS. 23(A)-(E) are grayscale photographs of lighting systems that differ from each other by the orientation of the elongated features of inner and outer structured surfaces relative to the longitudinal axis of the cavity or tube, where no reflective endcap and no strip of highly reflective film were used.

A lighting system made that comprised a CREE XML-6000K cool white LED that was mounted with thermally conductive tape to a heat sink. A Ledil FA 11909 Collimating optic was placed over the CREE LED to produce an LED light source assembly with 14 degree full width half max collimation. A coupling fixture with a square base was placed over the LED light source assembly. The other side of the coupling fixture had a cylindrical shape design to receive and hold an ~1 inch OD polycarbonate tube. The polycarbonate tube wall thickness was ~2 mm. acrylic polycarbonate tube with a length of 17.25 inches was used. Two sided structured films with orthogonal linear aspheric prisms structures on opposite sides of the same substrate were cut out from larger pieces of film at varying angles such that they comprised rectangles with a width of 69 mm and length of 17.25 inches. The rectangular films were rolled up around the long axis of the film and were inserted into the polycarbonate tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. The orientations of the inner and outer prisms of the five structured optical films are shown in FIG. 23 A-E. The dashed line represents the orientation of the inner linear prism relative to the longitudinal axis of the polycarbonate tube and the solid line represents the orientation of the outer linear prism relative to the longitudinal axis of the acrylic tube. The two sets of linear aspheric prisms for the films shown in FIG. 23A-E all have an orthogonal arrangement two one another, have a 90 degree angle between them. As can be seen, in FIG. 23 the inner linear prism orientation starts in FIG. 23A with an orientation that is 90 degrees or orthogonal to the longitudinal axis of the polycarbonate tube and the axis of light propagation. For each successive example in FIG. 23 the inner and outer prisms are rotated in increments of 22.5 degrees and the inner linear prisms become more aligned with the longitudinal axis of the polycarbonate tube and light propagation direction. FIG. 23B has an inner prism orientation that is at 67.5 degrees relative to the longitudinal tube axis (longitudinal tube axis being 0 degrees). FIG. 23C has an inner prism angle of 45 degrees relative to the longitudinal axis of the polycarbonate tube. FIG. 23D has an inner prism angle of 22.5 degrees relative to the longitudinal axis of the tube. FIG. 23 E has an inner prism angle of 0 degrees with respect to the longitudinal axis and is thus aligned with the longitudinal axis. The series of pictures in FIG. 23 were taken using a Prometric Camera (available from Radiant Zemax, LLC, Redmond, Wash.), using a 105 mm lens and NDI filter from a distance of ~1.5 meters. The tube assembly was illuminated with the LED running at 0.5 A and 3V and shows that rotation of the inner prism can lead to improved uniformity of appearance for the tube when viewed from an orthogonal direction to the tube surface.

Example 2

FIG. 24 A-G

Using the same lighting system architecture described in FIG. 23, a series of two sided structured films was made having linear aspheric prisms structures at various orientations on opposite sides of a unitary film construction. The orientations are shown pictorially in the figures, where the inner prism orientation is represented by the dashed line and the outer prism orientation is represented by the solid line. The inner and outer prism angles are disposed in each example such that they are symmetric about the longitudinal axis of the tube and the light propagation axis, i.e. if the inner prism is oriented with a+45 degree orientation relative to the longitudinal axis of the tube, the outer prism has an orientation of −45 degrees relative to the longitudinal axis of the tube. The linear prisms thus have an included angle between them of 90 degrees. Table 1 shows the orientations of the inner and outer prisms for each of the examples 24A-G.

TABLE 1

Orientations of inner and outer linear prisms for film constructions in FIG. 24.

Figure 24G:
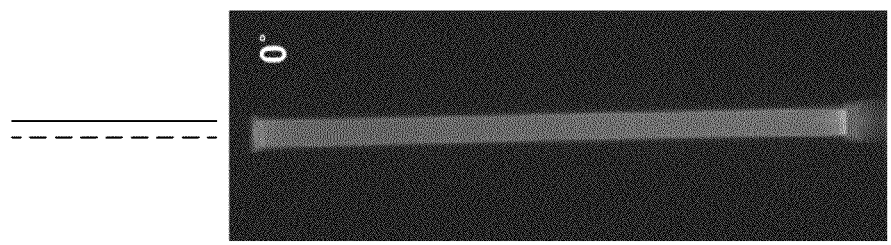
Figure 24F:
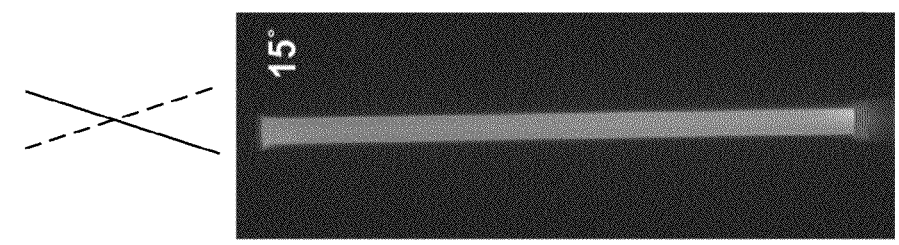
Figure 24E:
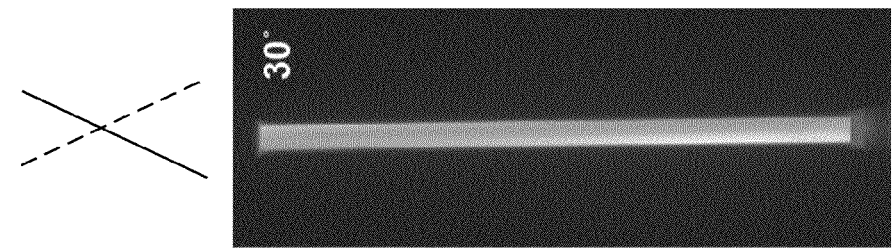

| Example in FIG. 24 | Inner/outer prism angle relative to longitudinal axis of the tube | Included Angle between linear prism on two sides of the film construction |
|---|---|---|
| FIG. 24A | +/−90 degrees | 180 degrees |
| FIG. 24B | +/−75 degrees | 150 degrees |
| FIG. 24C | +/−60 degrees | 120 degrees |
| FIG. 24D | +/−45 degrees | 90 degrees |
| FIG. 24E | +/−30 degrees | 60 degrees |
| FIG. 24F | +/−15 degrees | 30 degrees |
| FIG. 24G | +/−0 degrees | 0 degrees |

FIG. 24A: Two 8 inch wide strips, 24 inches in length, of single side aspheric linear prism film prepared as described above on 2 mil PET were cut out of a larger sheet of film with the linear prisms running orthogonal to the length direction of the film. The two strips were then laminated together with a 2 mil optically clear adhesive (8172CL available from 3M as a dual side linered laminating adhesive) to from an optical film construction with linear aspheric prism on two sides that were aligned with one another. From this film an ~69 mm wide strip, 17.25 inches in length, was cut. This rectangular film was rolled up around the long axis of the film and was inserted into the polycarbonate tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. FIG. 24 A shows a Prometric image of the illuminated tube with the LED running at 0.5 A and 3V FIG. 24B: Two 8 inch wide strips, 24 inches in length, of single side aspheric linear prism film prepared as described above on 2 mil PET were cut out of a larger sheet of film with the linear prisms oriented at a 75 degree angle to the length direction of the film. The two strips were then laminated together with a 2 mil optically clear adhesive (8172CL available from 3M as a dual side lingered laminating adhesive) to from an optical film construction with linear aspheric prism on two sides that were disposed at angles of +/−75 degrees thus forming crossed linear prisms with an included angle of 150 degrees. From this film an ~69 mm wide strip, 17.25 inches in length, was cut. This rectangular film was rolled up around the long axis of the film and was inserted into the polycarbonate tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. FIG. 24 B shows a Prometric image of the illuminated tube with the LED running at 0.5 A and 3V.

FIG. 24C: Two 8 inch wide strips, 24 inches in length, of single side aspheric linear prism film prepared as described above on 2 mil PET were cut out of a larger sheet of film with the linear prisms oriented at a 60 degree angle to the length direction of the film. The two strips were then laminated together with a 2 mil optically clear adhesive (8172CL available from 3M as a dual side linered laminating adhesive) to from an optical film construction with linear aspheric prism on two sides that were disposed at angles of +/−60 degrees, thus forming crossed linear prisms with an included angle of 120 degrees. From this film an ~69 mm wide strip, 17.25 inches in length, was cut. This rectangular film was rolled up around the long axis of the film and was inserted into the polycarbonate tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. FIG. 24 C shows a Prometric image of the illuminated tube with the LED running at 0.5 A and 3V.

FIG. 24D: The +/−45 degree film shown in FIG. 24D is the same construction as that shown in FIG. 23C where the included angle of between the linear prism on the two sides of the film have an included angle of 90 degrees and the crossed prisms are symmetric about the longitudinal axis of the tube. FIG. 24 D shows a Prometric image of the illuminated tube with the LED running at 0.5 A and 3V.

FIG. 24E: Two 8 inch wide strips, 24 inches in length, of single side aspheric linear prism film prepared as described above on 2 mil PET were cut out of a larger sheet of film with the linear prisms oriented at a 30 degree angle to the length direction of the film. The two strips were then laminated together with a 2 mil optically clear adhesive (8172CL available from 3M as a dual side linered laminating adhesive) to from an optical film construction with linear aspheric prism on two sides that were disposed at angles of +/−30 degrees, thus forming crossed linear prisms with an included angle of 60 degrees. From this film an ~69 mm wide strip, 17.25 inches in length, was cut. This rectangular film was rolled up around the long axis of the film and was inserted into the polycarbonate tube. The film flexed to conform to the shape of the inner surface of the polycrabonate tube. One end of the tube was inserted into the cylindrical coupling element to align the center of the tube with the LED assembly, such that collimated light was directed into the center of the tube. The other end of the tube in these examples was left open. FIG. 24 E shows a Prometric image of the illuminated tube with the LED running at 0.5 A and 3V.

FIG. 24F: Two 8 inch wide strips, 24 inches in length, of single side aspheric linear prism film prepared as described above on 2 mil PET were cut out of a larger sheet of film with the linear prisms oriented at a 15 degree angle to the length direction of the film. The two strips were then laminated together with a 2 mil optically clear adhesive (8172CL available from 3M as a dual side linered laminating adhesive) to from an optical film construction with linear aspheric prism on two sides that were disposed at angles of +/−30 degrees, thus forming crossed linear prisms with an included angle of 60 degrees. From this film an ~69 mm wide strip, 17.25 inches in length, was cut. This rectangular film was rolled up around the long axis of the film and was inserted into the polycarboante tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. FIG. 24 F shows a Prometric image of the illuminated tube with the LED running at 0.5 A and 3V.

FIG. 24G: Two 8 inch wide strips, 24 inches in length, of single side aspheric linear prism film prepared as described above on 2 mil PET were cut out of a larger sheet of film with the linear prisms oriented at a 0 degree angle to the length direction of the film. The two strips were then laminated together with a 2 mil optically clear adhesive (8172CL available from 3M as a dual side linered laminating adhesive) to form an optical film construction with linear aspheric prism on two sides that were disposed at angles of +/−0 degrees, thus forming aligned linear prisms that were aligned with the longitudinal axis of the tube. From this film an ~69 mm wide strip, 17.25 inches in length, was cut. This rectangular film was rolled up around the long axis of the film and was inserted into the polycarbonate tube. The film flexed to conform to the shape of the inner surface of the polycarbonate tube. One end of the tube was inserted into the cylindrical coupling element to align the center of the tube with the LED assembly, such that collimated light was directed into the center of the tube. The other end of the tube in these examples was left open. FIG. 24 G shows a Prometric image of the illuminated tube with the LED running at 0.5 A and 3V.

The series of pictures in FIGS. 24 A-G show that rotation of the inner prism can lead to improved uniformity of appearance for the tube when viewed from an orthogonal direction to the tube surface.

Example 3

FIG. 25 A-E

Figures 25A, 25B, 25C, 25D, 25E:
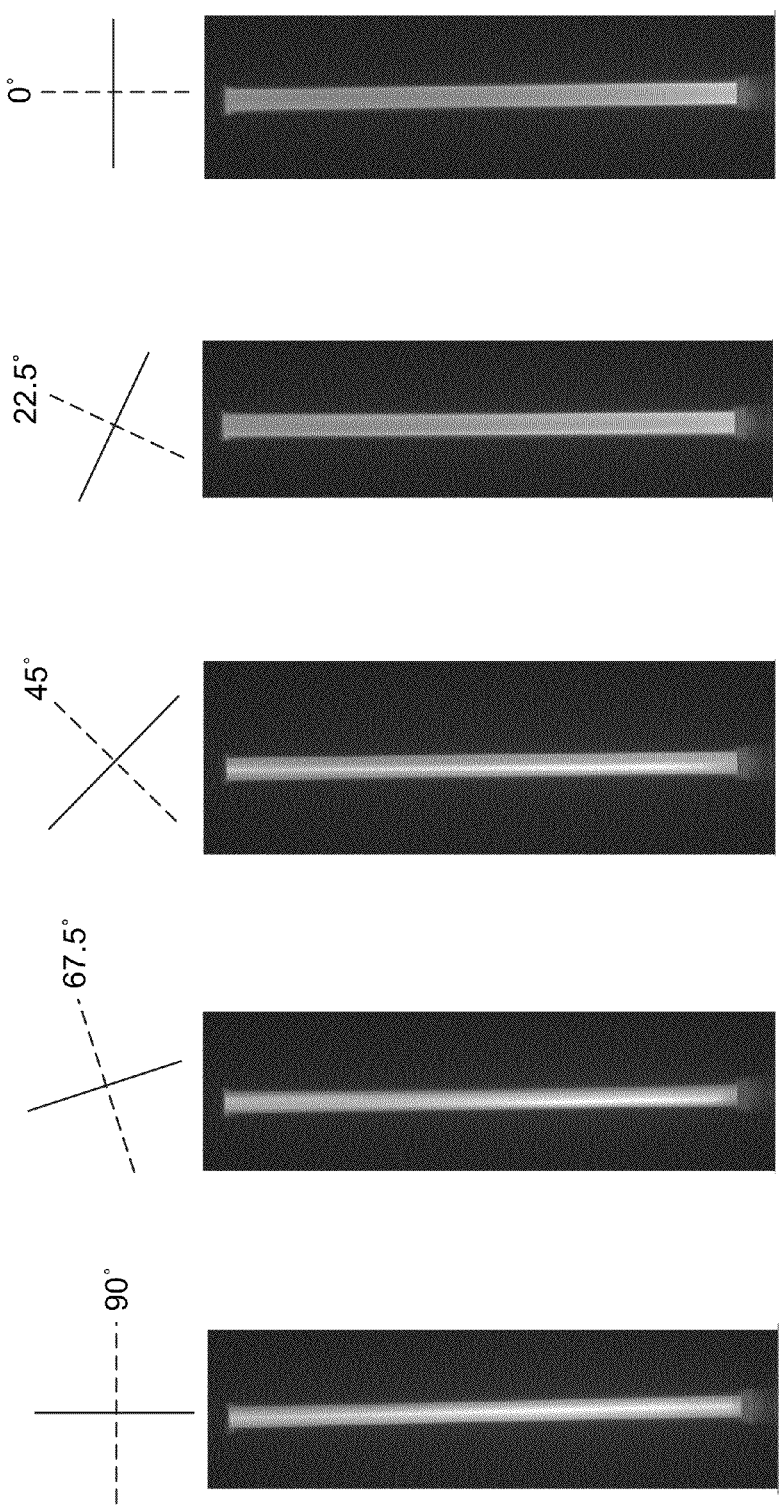
FIGS. 25(A)-(E) are grayscale photographs of lighting systems similar to those of FIGS. 24(A)-(G), but where a constant angle of intersection is maintained between the elongated features of the inner structured surface and the elongated features of the outer structured surface.

FIG. 25 A-E show the same Lighting systems having the same prism films shown in FIG. 23 A-E, but with the addition of a 47 mm wide specular ESR reflector (available from 3M) inserted into the tube to act as a reflective guiding layer that defined an aperture where the light can emit from the tube. A specular ESR cap was also placed on the distal end of the tube to reflect back light that was not extracted from the tube on a first pass. The figures show that the reflective layer acts to effectively enhance the transport of the light down the tube axis to produce more uniformly illuminated linear light sources.

Example 4

FIG. 26 A-B

Figure 26A:
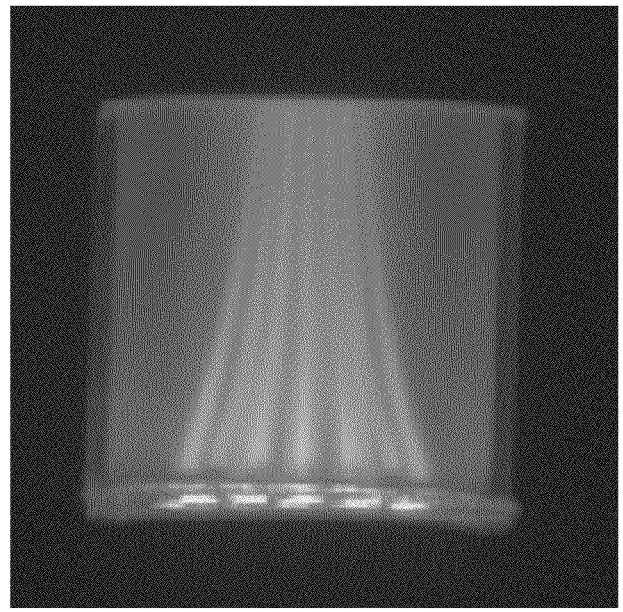
FIG. 26A is a grayscale photograph of a small aspect ratio lighting system in which the elongated features of the inner and outer structured surfaces are parallel to each other and perpendicular to the longitudinal axis of the cavity or tube, such that they form no helixes.

FIG. 26A shows a Prometric image of a short acrylic tube with a length of ~2.25 inches and width of ~2 inches. A film with aligned linear aspheric prism structures on two sides of the film, prepared in a similar manner to that described in FIG. 24A was placed inside the acrylic tube and the film conformed to the inner surface of the tube. The acrylic tube with two sided structure film was affixed to the top of an MR-16 4000K lamp (available from Eveready) having 24 white LEDs with a lambertian output and a round disc of a reflective polarizer film, DBEF-D2-400 (available from 3M) with a diameter of 2.25 inches was placed over the open distal end of the acrylic tube. The lamp was powered with 4.5 W at 12 V. As can be seen in the image of the lighting assembly produces a strong filament appearance.

Figure 26B:
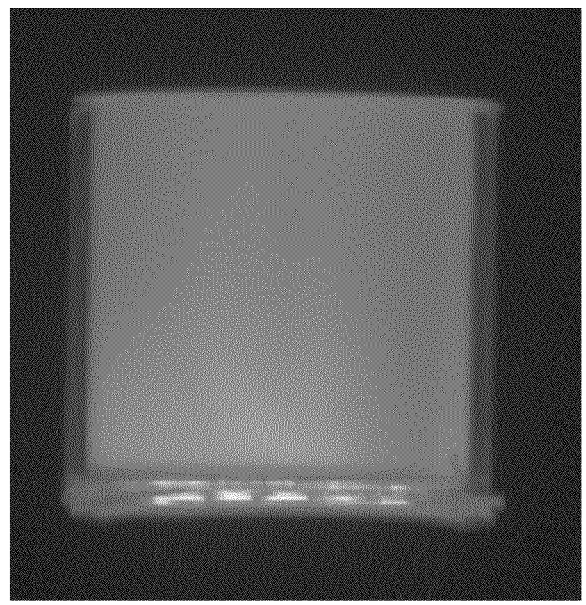
FIG. 26B is a grayscale photograph of a small aspect ratio lighting system similar to that of FIG. 26A except that the structured surface films are oriented so that the elongated features of the inner and outer structured surfaces are obliquely oriented relative to the longitudinal axis of the cavity or tube, such that they form helixes.

FIG. 26B shows a Prometric image of a short acrylic tube with a length of ~2.25 inches and width of ~2 inches. A film with crossed linear aspheric prism structures on two sides of the film similar to that described in FIG. 23C was placed inside the acrylic tube and the film conformed to the inner surface of the tube. The acrylic tube with two sided structure film was affixed to the top of an MR-16 4000K lamp (available from Eveready) having 24 white LEDs with a lambertian output and a round disc of a reflective polarizer film, DBEF-D2-400 (available from 3M) with a diameter of 2.25 inches was placed over the open distal end of the acrylic tube. The lamp was powered with 4.5 W at 12 V. As can be seen in the image of the lighting assembly the appearance is uniform.

Example 5

FIG. 26C-D

Figure 26C:
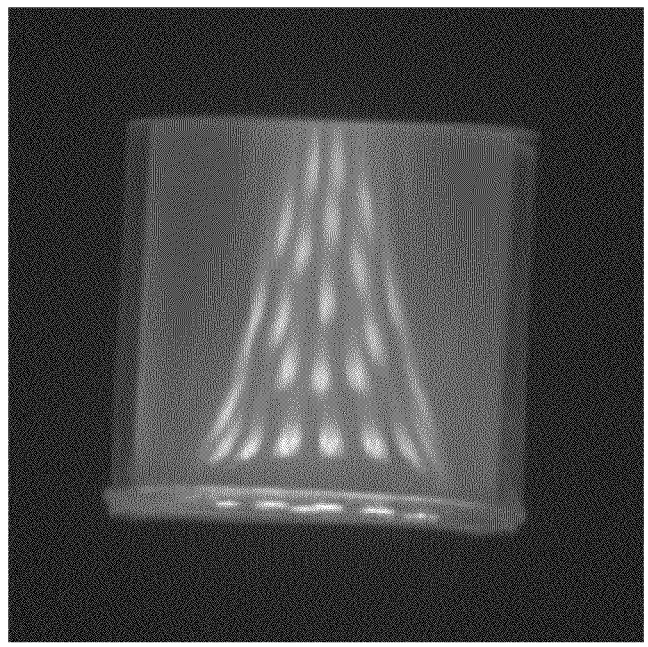
FIGS. 26C and 26D are grayscale photographs of small aspect ratio lighting systems similar to those of FIGS. 26A and 26B, respectively, except that the elongated features on the inner and outer structured surfaces are prismatic features rather than lenticular features.

FIG. 26C shows a Prometric image of a short acrylic tube with a length of ~2.25 inches and width of ~2 inches. A film with aligned linear turning film prism structures on two sides of the film was prepared by laminating two pieces of turning film with a 2 mil Optically Clear Adhesive, 8172CL such that the linear prisms were aligned. The laminated film was cut to make a rectangular film that was placed inside the acrylic tube, where the film conformed to the inner surface of the tube with the linear prisms oriented orthogonally to the tube axis. The acrylic tube with two sided structure film was affixed to the top of an MR-16 4000K lamp (available from Eveready) having 24 white LEDs with a lambertian output and a round disc of a reflective polarizer film, DBEF-D2-400 (available from 3M) with a diameter of 2.25 inches was placed over the open distal end of the acrylic tube. The lamp was powered with 4.5 W at 12 V. As can be seen in the image of the lighting assembly produces a strong filament appearance.

Figure 26D:
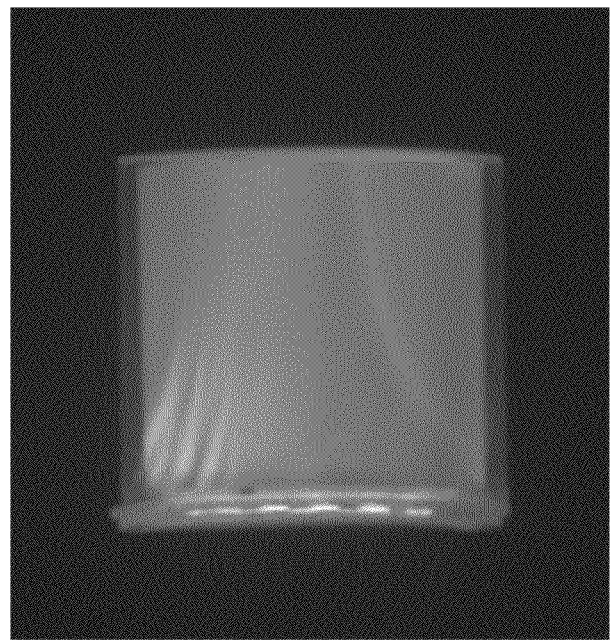
Figures 27A, 27B:
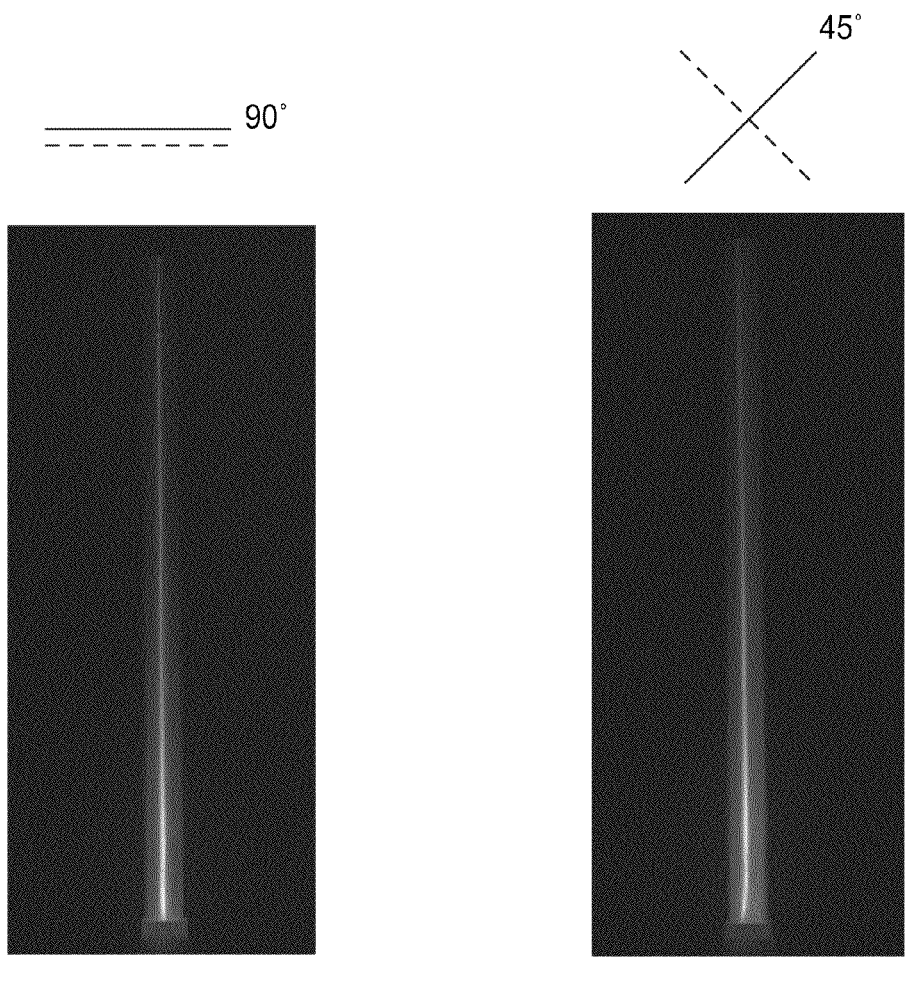
FIG. 27A is a grayscale photograph of a lighting system in which the elongated features of the inner and outer structured surfaces are parallel to each other and perpendicular to the longitudinal axis of the cavity or tube, such that they form no helixes, the elongated features on the inner and outer structured surfaces being prismatic features and lenticular features, respectively, and where no reflective endcap and no strip of highly reflective film were used.
FIG. 27B is a grayscale photograph of a lighting system similar to that of FIG. 27A, but where the elongated features on the inner and outer structured surfaces are oriented at 90 degrees to each other and 45 degrees relative to the longitudinal axis of the cavity or tube.

FIG. 26D shows a Prometric image of a short acrylic tube with a length of ~2.25 inches and width of ~2 inches. A film with linear turning film prism structures on two sides of the film was prepared by laminating two pieces of turning film with a 2 mil Optically Clear Adhesive, 8172CL such that the linear prisms were crossed, with the two prisms aligned at +/−45 degrees forming an included angle of 90 degrees. The laminated film was cut to make a rectangular film that was placed inside the acrylic tube, where the film conformed to the inner surface of the tube with the linear prisms were oriented symmetrically to the tube axis at +/−45 degrees. The acrylic tube with two sided structure film was affixed to the top of an MR-16 4000K lamp (available from Eveready) having 24 white LEDs with a lambertian output and a round disc of a reflective polarizer film, DBEF-D2-400 (available from 3M) with a diameter of 2.25 inches was placed over the open distal end of the acrylic tube. The lamp was powered with 4.5 W at 12 V. As can be seen in the image of the lighting assembly the appearance is more uniform than that shown in FIG. 26C.

Example 6

FIG. 27A-B

A film was made with aligned linear prism structures on two sides of the film where one film comprising linear turning film prisms was laminated to a second linear prism film comprising linear aspheric prisms with a 2 mil Optically Clear Adhesive, 8172CL. The laminated film was cut to make a rectangular film with a width of ~69 mm and length of 17.25 inches such that the aligned linear prisms were oriented orthogonally to the length of the rectangular film. The rectangular film was rolled up around the long axis of the film and was inserted into the polycarbonate tube of the lighting assembly described in Example 1 such that the turning film prisms were on the inside of the tube. The LED was powered at 0.5 A and 3V and a prometric image in shown in FIG. 27A.

Another film was made having crossed linear prisms where one film comprising turning film prisms was laminated to a second film having linear aspheric prisms with a 2 mil Optically Clear Adhesive, 8172CL. The laminated film was cut to make a rectangular film with a width of ~69 mm and length of 17.25 inches such that the linear prisms were oriented at +/−45 degree angles relative to the length direction of the film. The rectangular film was rolled up around the long axis of the film and was inserted into the polycarbonate tube of the lighting assembly described in Example 1 such that the turning film prisms were on the inside of the tube. The LED was powered at 0.5 A and 3V and a prometric image in shown in FIG. 27B.

The appearance of both tubes with respect to uniformity is slightly improved in the case where the inner turning film is at an angle with respect to the longitudinal axis of the tube. The difference is not as pronounced as with the examples in which the surface features of the inner structured surface have curvature.

Example 7

FIG. 28A-B

A lighting system made that comprised a CREE XML-6000K cool white LED that was mounted with thermally conductive tape to a heat sink. A Ledil FA 11909 Collimating optic was placed over the CREE LED to produce an LED light source assembly with 14 degree full width half max collimation. A coupling fixture with a square base was placed over the LED light source assembly. The other side of the coupling fixture had a cylindrical shape design to receive and hold an ~1 inch OD acrylic tube. The acrylic tube wall thickness was ~1 mm. An acrylic tube with a length of 8 inches was used.

FIG. 28A shows an illuminated tube using 0.5 A and 3V where the tube has two single sided structured films, 70 mm width and 8 inches in length, that were placed inside of the tube. The structured films were not bonded to one another and have an air gap between them. The films conformed to the inner wall of the tube. The inner structured surface film with prisms disposed inside of the tube was the 2D structured film described above having elongated prisms with an approximate 3:1 aspect ratio of length to width, the prism features having curvature as shown in FIG. 9. The end of the tube opposite the light source was fitted with a specularly reflective ESR reflective cap. The inner elongated 2D prisms were oriented such that the extended axis of the prisms were oriented at +45 degrees relative to the longitudinal axis of the tube. The outer prism film was the linear aspheric prism film described above where the prism orientation was at −45 degrees relative to the longitudinal axis of the tube. The two sets of prisms of the two structured films were oriented such that there was an included angle between them of 90 degrees where the longitudinal axis of the tube bisected the crossed prism structures.

FIG. 28B shows an illuminated tube using 0.5 A and 3V where the tube has two single sided structured films, 70 mm width and 8 inches in length, that were placed inside of the tube. The structured films were not bonded to one another and have an air gap between them. The films conformed to the inner wall of the tube. The inner structured surface film with prisms disposed inside of the tube was the 2D structured film described above having elongated prisms with an approximate 3:1 aspect ratio of length to width, the prism features having curvature as shown in FIG. 9. The end of the tube opposite the light source was fitted with a specularly reflective ESR reflective cap. The inner elongated 2D prisms were oriented such that the extended axis of the prisms were oriented at +90 degrees relative to the longitudinal axis of the tube. The outer prism film was the linear aspheric prism film described above where the prism orientation was at −90 degrees relative to the longitudinal axis of the tube. The two sets of prisms of the two structured films were oriented such that the prisms were aligned and the prisms were orthogonal to the longitudinal axis of the tube.

The lighting systems of FIGS. 28A and 28B show similar uniformity, but the system of FIG. 28A with the 2-D elongated features at an oblique angle to the tube longitudinal axis is slightly brighter.

Example 8

FIG. 29A-B

Figures 29A, 29B:
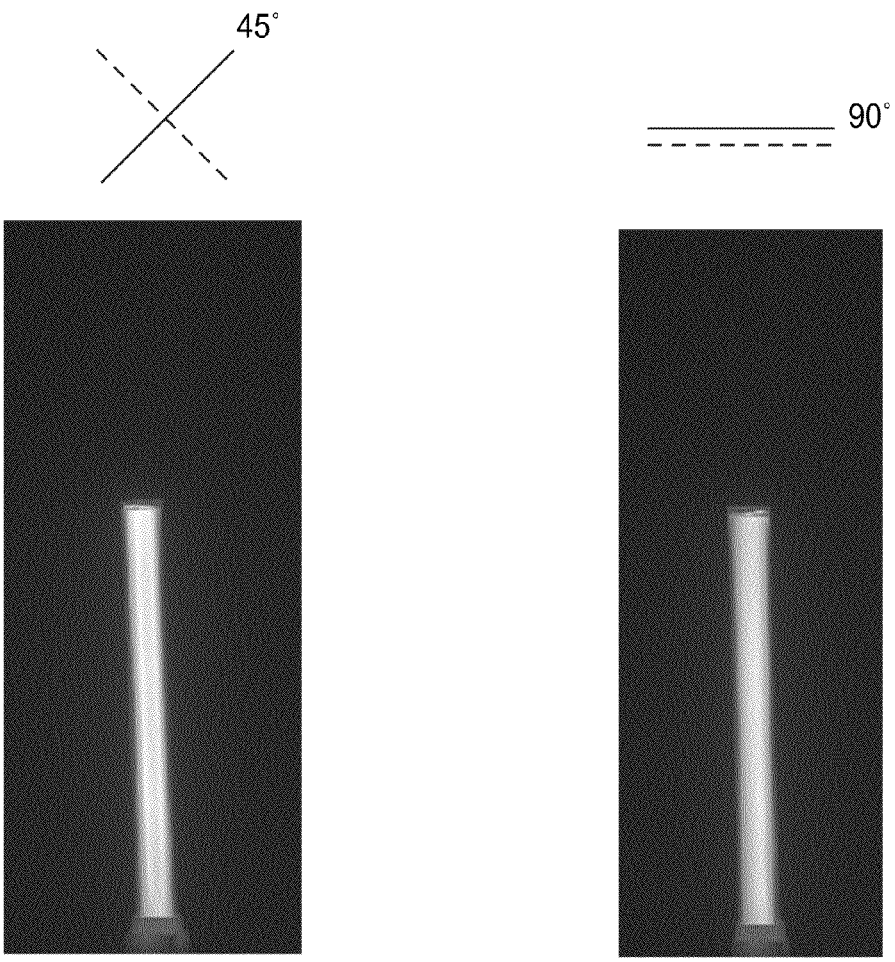
FIG. 29A is a grayscale photograph of a lighting system similar to that of FIG. 28A, except that a strip of highly reflective film was also used.
FIG. 29B is a grayscale photograph of a lighting system similar to that of FIG. 29A, but where the elongated features on the inner and outer structured surfaces are parallel to each other and perpendicular to the longitudinal axis of the cavity or tube.

FIG. 29A is the same lighting system construction as that described in FIG. 28A, where the prisms of the 2D elongated structured film and linear aspheric prism film were crossed with orientation about the longitudinal tube axis of +/−45 degrees. An ESR reflective film, 40 mm in width and 8 inches and length was added to the tube. The ESR conformed to the surface of the tube wall inside of the inner structured surface. The LED was powered at 0.5 A and 3V to illuminate the tube. The image was captured using a calibrated Prometric Camera with exposure set to prevent saturation of the CCD.

FIG. 28B is the same lighting system construction as that described in FIG. 28B, where the prisms of the 2D elongated structured film and linear aspheric prism film were aligned with one another with orientation about the longitudinal tube axis of +/−90 degrees or orthogonal to the longitudinal axis of the tube. An ESR reflective film, 40 mm in width and 8 inches and length was added to the tube. The ESR conformed to the surface of the tube wall inside of the inner structured surface. The LED was powered at 0.5 A and 3V to illuminate the tube. The image was captured using a calibrated Prometric Camera with exposure set to prevent saturation of the CCD.

The crossed prism films in FIG. 29A produce a brighter with a more uniform appearance than the aligned prisms that are orthogonal to the longitudinal axis of the tube in FIG. 29B.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A lighting system, comprising:
    a light-transmissive tube defining a cavity that extends along a longitudinal axis, at least a portion of the tube comprising an inner structured surface facing the cavity, and an outer structured surface facing away from the cavity;
    a light source assembly disposed to inject light into the cavity, the inner structured surface being configured to direct a first portion of the injected light towards the outer structured surface and to direct a second portion of the injected light back into the cavity;
    wherein the inner structured surface comprises elongated first features and the outer structured surface comprises elongated second features, at least one of the elongated first features and the elongated second features being oriented obliquely relative to the longitudinal axis such that they form respective helixes along the tube.

2. The system of claim 1, wherein both the elongated first features and the elongated second features are oriented obliquely relative to the longitudinal axis.

3. The system of claim 1, wherein the elongated first features have an orientation relative to the elongated second features characterized by an angle of intersection.

4. The system of claim 3, wherein the angle of intersection is substantially 90 degrees.

5. The system of claim 3, wherein the longitudinal axis bisects the angle of intersection.

6. The system of claim 1, wherein the elongated first features and the elongated second features both comprise curved surfaces.

7. The system of claim 1, wherein at least one of the elongated first features and the elongated second features comprise a shape characterized by a cubic Bezier function.

8. The system of claim 1, wherein the tube comprises distinct first and second structured films, and wherein the first structured film comprises the inner structured surface and the second structured film comprises the outer structured surface.

9. The system of claim 1, wherein the tube comprises a structured film with opposed first and second major surfaces, and wherein the first major surface comprises the inner structured surface and the second major surface comprises the outer structured surface.

10. The system of claim 1, wherein the light source assembly comprises one or more solid state light sources.

11. The system of claim 10, wherein the one or more solid state light sources includes a first solid state light source that has a first output distribution, the first output distribution being characterized by a full width of half maximum polar angle of +/−14 degrees.

12. The system of claim 10, wherein the one or more solid state light sources comprises a plurality of light emitting diodes (LEDs) of substantially different emission spectra.

13. The system of claim 1, wherein the tube has a cross-sectional shape in a plane perpendicular to the longitudinal axis, the cross-sectional shape being curved, polygonal, or a combination of curved and polygonal.

14. The system of claim 1, wherein the outer structured surface is configured to direct most of the first portion of the injected light outward from the tube.

15. The system of claim 1, wherein the light-transmissive tube is a first light-transmissive tube, the longitudinal axis is a first longitudinal axis, the inner structured surface is a first inner structured surface, the outer structured surface is a first outer structured surface, the cavity is a first cavity, and the light source assembly is a first light source assembly, the system further comprising:
- a second light-transmissive tube defining a second cavity that extends along a second longitudinal axis parallel to the first longitudinal axis, at least a portion of the second tube comprising a second inner structured surface facing the second cavity, and a second outer structured surface facing away from the second cavity;
- a second light source assembly disposed to inject light into the second cavity, the second inner structured surface being configured to direct a first portion of the injected light from the second light source into the second tube and to direct a second portion of such injected light back into the second cavity;
- wherein the second inner structured surface comprises elongated third features and the second outer structured surface comprises elongated fourth features, at least one of the elongated third features and the elongated fourth features being oriented obliquely relative to the second longitudinal axis such that they form respective helixes along the second tube.

16. The system of claim 15, wherein the first and second inner structured surfaces are different portions of a single inner structured surface, and the first and second outer structured surfaces are different portions of a single outer structured surface.

17. The system of claim 15, wherein the first light-transmissive tube includes a light-transmissive portion and a highly reflective portion, the light-transmissive portion having the first inner structured surface and the first outer structured surface.

18. The system of claim 17, wherein the highly reflective portion is opaque.

19. The system of claim 15, wherein the system includes a reflective wall with opposed first and second highly reflective surfaces, the first highly reflective surface forming part of the first light-transmissive tube and the second highly reflective surface forming part of the second light-transmissive tube.

20. The system of claim 1, further comprising:
- a first highly reflective optical film that partially surrounds the cavity to provide at least a first elongated aperture for the lighting system.

21. The system of claim 20, wherein the first highly reflective optical film has an average reflectivity for the injected light at a design angle of incidence of at least 90%.

22. The system of claim 20, wherein a structured surface film comprises at least one of the inner and outer structured surfaces, and wherein the first highly reflective optical film is smaller than the structured surface film and attaches to the structured surface film over substantially an entire major surface of the first highly reflective optical film.

23. The system of claim 20, wherein the inner and outer structured surfaces are included on a first strip of at least one structured film, and wherein the first highly reflective optical film comprises a second strip, and wherein the first and second strips partially overlap to define an overlap region and attach to each other along the overlap region.

24. The system of claim 23, further comprising a second highly reflective optical film that partially surrounds the cavity to provide at least a second elongated aperture for the lighting system different from the first elongated aperture.

* * * * *